(12) United States Patent
Araki et al.

(10) Patent No.: US 8,601,510 B2
(45) Date of Patent: Dec. 3, 2013

(54) USER INTERFACE FOR INTERACTIVE DIGITAL TELEVISION

(75) Inventors: John Araki, Tustin, CA (US); Kenneth M. Randall, Eastvale, CA (US); Klaus Libor, Ladera Ranch, CA (US); Arthur B. Moore, Arcadia, CA (US)

(73) Assignee: Westinghouse Digital, LLC, Orange, CA (US)

( * ) Notice: Subject to any disclaimer, the term of this patent is extended or adjusted under 35 U.S.C. 154(b) by 178 days.

(21) Appl. No.: 12/909,118

(22) Filed: Oct. 21, 2010

(65) Prior Publication Data

US 2011/0093889 A1  Apr. 21, 2011

Related U.S. Application Data

(60) Provisional application No. 61/253,601, filed on Oct. 21, 2009.

(51) Int. Cl.
*H04N 5/445* (2011.01)

(52) U.S. Cl.
USPC .................. 725/41; 725/44; 348/734

(58) Field of Classification Search
USPC ................ 725/37–61; 709/217–232; 348/734
See application file for complete search history.

(56) References Cited

U.S. PATENT DOCUMENTS

| | | | |
|---|---|---|---|
| 4,787,051 A | 11/1988 | Olson | |
| 5,138,154 A | 8/1992 | Hotelling | |
| 5,181,181 A | 1/1993 | Glynn | |
| 5,440,326 A | 8/1995 | Quinn | |
| D378,751 S | 4/1997 | Smith et al. | |
| 5,698,584 A | 12/1997 | Black et al. | |
| 5,825,350 A | 10/1998 | Case, Jr. et al. | |
| 5,896,123 A | 4/1999 | Nagahara et al. | |
| 5,898,421 A | 4/1999 | Quinn | |
| 6,016,144 A | 1/2000 | Blonstein | |
| 6,028,609 A | 2/2000 | Kawakami | |
| 6,043,818 A | 3/2000 | Nakano et al. | |
| 6,100,889 A | 8/2000 | Sciammarella et al. | |
| 6,115,028 A | 9/2000 | Balakrishnan et al. | |
| 6,133,962 A | 10/2000 | Proehl et al. | |
| 6,164,808 A | 12/2000 | Shibata | |
| 6,195,089 B1 | 2/2001 | Chaney | |
| 6,249,290 B1 | 6/2001 | Herndon et al. | |
| 6,307,564 B1 | 10/2001 | Kawakami | |
| 6,320,599 B1 | 11/2001 | Sciammarella et al. | |
| 6,396,962 B1 | 5/2002 | Haffey et al. | |
| 6,421,067 B1 | 7/2002 | Kamen et al. | |
| 6,434,447 B1 | 8/2002 | Shteyn | |
| 6,462,763 B1 | 10/2002 | Mostyn | |
| 6,577,350 B1 | 6/2003 | Proehl et al. | |
| 6,744,967 B2 | 6/2004 | Kaminski et al. | |
| 6,817,028 B1 | 11/2004 | Jerding | |
| 6,892,360 B1 | 5/2005 | Pabla et al. | |
| 6,909,439 B1 | 6/2005 | Amro et al. | |

(Continued)

*Primary Examiner* — Annan Shang

(74) *Attorney, Agent, or Firm* — Renner, Otto, Boisselle & Sklar, LLP

(57) ABSTRACT

A method of controlling an interactive television includes displaying a layout on the interactive television that includes one or more visual cues to prompt a user regarding an action (click action) to be taken on an input device to activate a predetermined function (click event). The visual cues may include multiple visual cues, at least one of which is a visual cue for a cursor-based action that includes positioning a cursor with an input device, and another is a visual cue for a movement-based action that includes moving the input device.

24 Claims, 32 Drawing Sheets

(56) References Cited

U.S. PATENT DOCUMENTS

| | | |
|---|---|---|
| 7,016,011 B2 | 3/2006 | De Haan |
| 7,030,890 B1 | 4/2006 | Jouet et al. |
| 7,068,266 B1 | 6/2006 | Ruelle |
| 7,089,505 B2 | 8/2006 | Nagahara |
| 7,107,546 B2 | 9/2006 | Coulthard |
| 7,109,998 B2 | 9/2006 | Smith |
| 7,139,983 B2 | 11/2006 | Kelts |
| 7,158,118 B2 | 1/2007 | Liberty |
| 7,167,189 B2 | 1/2007 | DiLelle |
| 7,205,991 B2 | 4/2007 | Fitzmaurice |
| 7,221,380 B2 | 5/2007 | Hunter |
| 7,239,301 B2 | 7/2007 | Liberty et al. |
| 7,260,789 B2 | 8/2007 | Hunleth |
| 7,262,760 B2 | 8/2007 | Liberty |
| 7,385,650 B2 | 6/2008 | Kondo et al. |
| 7,386,806 B2 | 6/2008 | Wroblewski |
| 7,414,611 B2 | 8/2008 | Liberty |
| 7,603,683 B2 * | 10/2009 | Reto ............................ 725/34 |
| 2002/0083094 A1 | 6/2002 | Golovchinsky |
| 2003/0076363 A1 | 4/2003 | Murphy |
| 2003/0206195 A1 | 11/2003 | Matsa |
| 2003/0206665 A1 | 11/2003 | Pettigrew |
| 2004/0250216 A1 | 12/2004 | Roman |
| 2004/0250278 A1 | 12/2004 | Imai et al. |
| 2004/0268413 A1 | 12/2004 | Reid et al. |
| 2005/0007370 A1 | 1/2005 | Hunter |
| 2005/0195159 A1 | 9/2005 | Hunleth |
| 2006/0010395 A1 | 1/2006 | Aaltonen |
| 2006/0020905 A1 | 1/2006 | Wroblewski |
| 2006/0031876 A1 | 2/2006 | Ok |
| 2006/0184966 A1 | 8/2006 | Hunleth et al. |
| 2006/0256077 A1 | 11/2006 | Tsai |
| 2006/0262116 A1 | 11/2006 | Moshiri |
| 2006/0288308 A1 | 12/2006 | Enomoto et al. |
| 2007/0101297 A1 | 5/2007 | Forstall |
| 2007/0113207 A1 | 5/2007 | Gritton |
| 2007/0120846 A1 | 5/2007 | Ok |
| 2007/0176896 A1 | 8/2007 | Gritton |
| 2007/0186249 A1 | 8/2007 | Plourde |
| 2007/0211025 A1 | 9/2007 | Sato |
| 2008/0028294 A1 | 1/2008 | Sell |
| 2008/0060009 A1 | 3/2008 | Kelts |
| 2008/0060010 A1 | 3/2008 | Kelts |
| 2008/0060011 A1 | 3/2008 | Kelts |
| 2008/0060020 A1 | 3/2008 | Kelts |
| 2008/0111822 A1 | 5/2008 | Horowitz et al. |
| 2009/0190028 A1 * | 7/2009 | Rodriguez et al. ............ 348/448 |
| 2009/0281926 A1 | 11/2009 | Lin-Hendel |
| 2011/0093888 A1 | 4/2011 | Araki et al. |

* cited by examiner

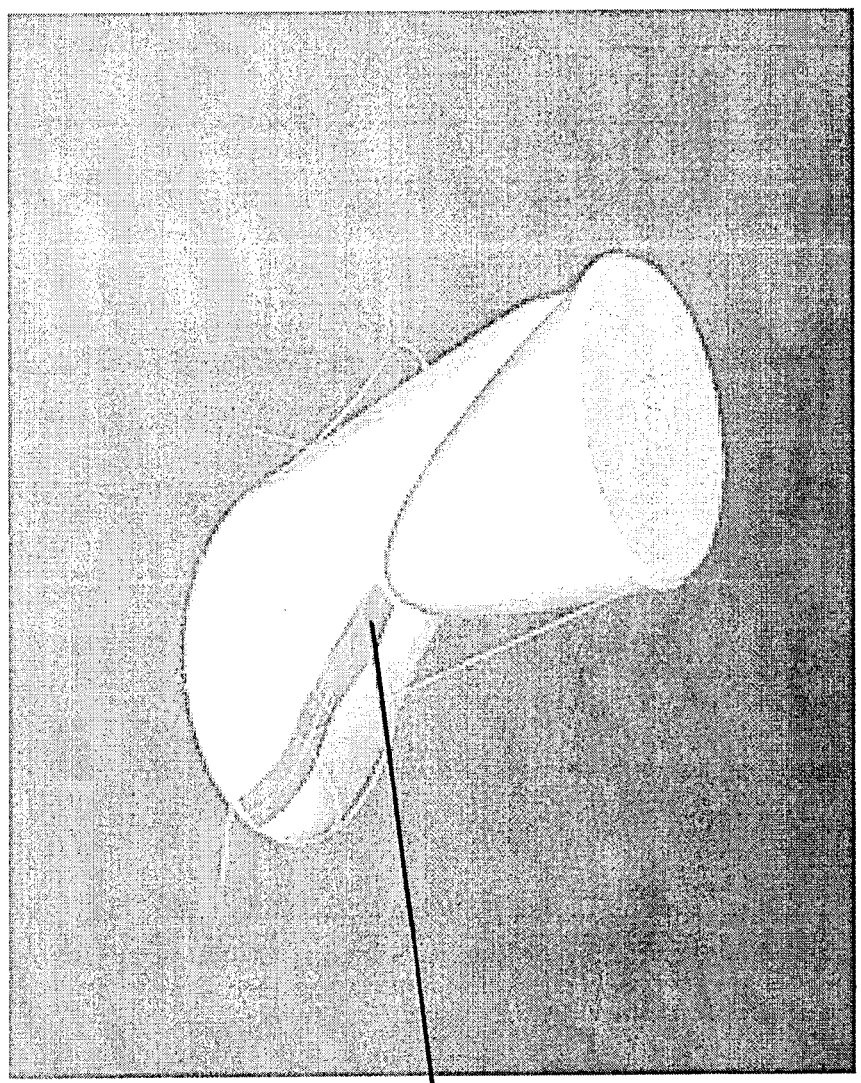
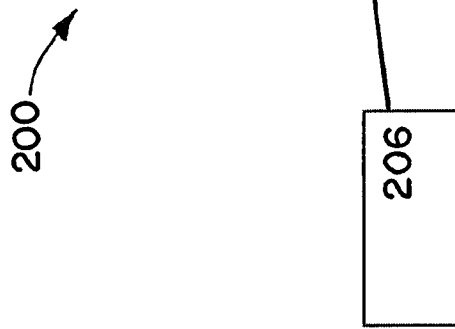
FIG. 13B

USER INTERFACE FOR INTERACTIVE DIGITAL TELEVISION

This application claims priority under 35 USC 119 to U.S. Provisional Application 61/253,601, filed Oct. 21, 2009, which is incorporated by reference in its entirety.

BACKGROUND OF THE INVENTION

The present inventions relate to interactive television, and to the display on a television screen of video and other content communicated over the Internet.

Interactive television (iTV) is television or video programming that incorporates interactivity. Interactive television is used as an umbrella term for the convergence of television with digital media technologies including Internet communications. Television and Internet content are viewed over similar display devices, but have profound differences. The Internet represents a two-way medium that carries largely static content based upon point-to-point distribution. Television remains primarily a one-way medium with dynamic content distributed in point-to-multipoint methods. Interactive television can be considered a combination of these systems, including certain features of each system in a hybrid medium. Interactive television combines the rich, dynamic content of television with the personalization and responsiveness of the Internet.

Internet and television may be merged by simply putting Internet content on a television screen, or conversely by viewing television content on a computer. The latter process is more easily accomplished, and is in widespread use. With proper hardware television programs and other video content can be successfully viewed on a personal computer screen. On the other hand, putting Web page from a computer browser directly on a television screen is generally not satisfactory to the user. Web content is typically viewed by a single user in close proximity to a personal computer screen, sometimes called the "one foot experience". The personal computer user interface can be called "lean forward", signifying an interactive experience with users who are actively engaged with activities on the screen. Conversely, television content is viewed at far greater distances, sometimes called the "ten foot experience". Traditional user interaction with television can be called "lean back", signifying users who are passive consumers of content. Adapting the personal computer user interface to the ten foot experience poses serious challenges in the visual interface design, and in the use of input devices for user interaction with the iTV. The present inventions address both of these challenges.

In the ten foot experience, normal Web fonts and graphics are typically too small to be comfortably viewed. In addition, whereas computer screens usually have a cursor to visually indicate the user's location on the screen, on TVs other than HDTVs cursors were difficult to locate. A possible solution for ITV systems is to trans-code Web page content on a specialized server for more appropriate display on a television screen, or on a client receiver or combination server-client process. For example, trans-codings may include larger-size font substitutions, and substitution for larger sized graphics with more apparent details. However, most companies are not prepared to spend the time or money to go through this effort.

One of the challenges in designing interactive television for the ten foot experience has been planning user input to the iTV. It is difficult to interact with traditional web pages using input devices typically associated with television. Navigation and typing are particularly difficult with infrared remote controls or a virtual keyboard rather than a mouse and real keyboard. The use of a remote control limits the traditional navigational model to a single dimension at a time (top-down or left-right). In addition, it is difficult for a user to select hyperlinks using infrared remotes. As a result, the user would sequence among links e.g. using arrow keys, and then press a "Go", OK or "Enter" key on the remote to switch a display to the linked page. Alphanumeric input has also been cumbersome using TV remotes, typically requiring entry of characters one-by-one using an alphanumeric menu. In summary, the use of a handheld TV remote for iTV navigation is awkward in comparison to a computer mouse and real keyboard located in fixed positions on a desk or table, which provide fast homing times and efficient alphanumeric input. However, for the ten foot experience the objective is to provide user input using a handheld device, not a device located on a desk or table.

A type of handheld input device that affords additional degrees of control is an inertial pointing device, such as a 3D pointing device. Inertial pointing devices use a tuning fork or other accelerometer to detect movement for every axis supported by the device. 3D pointing devices can determine device orientation as well as direction of movement in three (or more) dimensions. When used in connection with a television or computer display, 3D pointing devices move in the air in front of a display screen, and the user interface translates those motions directly into user interface commands, e.g., movement of a cursor on the display screen.

One of the most popular applications of iTV is distribution of video and audio content. Whereas traditional television relies on broadcast (content push) programming model, iTV relies on a library (content pull) programming model. iTV programming addresses viewers' desire to have control over their viewing experiences, for example to watch what they want when they want, and to be able to time-shift through media. The iTV user interface also can cater to an extended range of user interests, including not only the traditional TV function of entertainment but also for example shopping (ecommerce), widgets, social networking and education. A well-designed iTV user interface should facilitate user control over entertainment programming as well as access to content in other areas of interest, using a simple, logical and efficient framework.

SUMMARY OF THE INVENTION

Principal goals of the present invention include (a) Simplicity—employing a simple and consistent organization of elements to facilitate visual perception, together with a straightforward sequence of operations in navigating the user interface; and (b) Distance Viewing—providing a user interface that is compatible with viewing at a distance, the "ten foot experience"

The present interactive television user interface applies the following design principles:
  Reduces the number of key presses and mouse clicks needed to achieve the desired result (identify and play media, etc);
  Uses a primary screen with a simple clear layout, with a visually consistent arrangement of on-screen navigation elements;
  Uses prominent on-screen selectors consistent with distance viewing;
  Prefers meaningful graphical symbols and images to abstract icons; and Uses three dimensional effects, employing the axis extending into and out of the screen, that enhance the ten foot experience.

The interactive television user interface of the invention incorporates a novel graphical user interface (GUI) and a handheld user input device. The iTV GUI comprises a screen layout with a plurality of hot zones located at the corners of the iTV screen, preferably all four corners A hot zone is an area of active pixels of the iTV display that responds to a click action associated with a mouse cursor (a tracking spot that indicates the current position of a pointing device). A second principal component of the screen layout is a central menus screen. The central menu screen displays two-dimensional and three dimensional graphical objects that serve as prominent on-screen selectors suitable for distance viewing of the iTV. Optional elements of the basic screen layout include slider bars at the left and right screen edges for increase-decrease control of iTV functions, such as television channel and audio volume.

The invention also comprises an efficient GUI navigation method for an interactive television. In a preferred embodiment of the GUI navigation method, the user employs three click events to provide desired iTV output. In the basic navigational method, the user selects a function from one of the corner hot zones—the first click event. The first click event causes display of on-screen selector objects in the central menu screen. By selecting from the on-screen selector objects in the central menu screen the user displays a content screen—the second click event. The content screen enables the user to access desired content such as audiovisual works, ecommerce web sites, social networking web sites, user created content, etc. In the third click event, the user displays, plays, orders, or otherwise obtains desired content using the content screen.

In the interactive television user interface of the invention the viewer uses a handheld input apparatus to effect "click actions". A user-effected click action causes a "click event" i.e. an event-based programming response of the iTV, such as displaying a menu screen at the central menu screen area, launching an application, or linking to a URL. Click actions of the handheld input apparatus are mapped to click events—for example given movements of the apparatus can be mapped to given cursor motions, or to given movements or appearance changes of GUI objects.

The handheld input apparatus makes use of two types of click actions. In the first type of click action, the handheld input apparatus includes a pointing device or mouse with which a user moves a mouse cursor on the iTV display. A cursor-based click action is effected while the mouse cursor is located over an active pixel area of the screen, and may comprise a mouse over or mouse button click. The active pixel areas include the hot zones, as well as "hot spots" within the central menu screen. The second type of click action utilizes a motion-sensitive device. The motion-sensitive device senses a translational or rotational movement of the device, providing input to the graphical user interface based upon the sensed movement.

One aspect of the iTV screen layout of the invention is the physical arrangement of active pixel areas for interaction with the pointing device. The hot zones and the central menu area do not overlap, i.e. active pixel areas in the central menu screen (hot spots) cannot coincide with one of the hot zones. The hot zones are permanently active pixel areas anchored to the screen corners, whereas the hot spots in the central menu area are pixel areas that are active only at certain states of the navigation interface typically involving opening of an application or web page. GUI objects that interact with pointing devices also can include an "extended zone", which corresponds to one of the hot zones and is anchored at the same screen corner as that hot zone but is larger than the hot zone. An extended zone may appear in response to a pointing device click action (button click or mouse over) at one of the hot zones, and contains temporarily activated pixel areas typically arranged in a plurality of layers. Unlike the hot zones the extended zones may overlap the central menu screen, and the extended zones generally display more information (graphics and text) than the hot zones.

The hot zones may be considered as the first level of the navigation interface; the central menu screen as the second level; and the content screen as the third level. In a basic "three-click" navigation method, a single click action at a hot zone (first level) launches GUI objects in the central menu screen—the first click event. A single click action acting on a GUI object in the central menu screen (second level) causes the display of a content page—the second click event. A single click action at the content page (third level) then provides the desired content—the third click event.

The first click event at one of the hot zones or the second click event at the central menu screen may also be effected through multiple click actions. An initial click action changes the appearance of the navigation interface to present additional information, and a subsequent click action navigates to the next level. In a first multi-click action example, at the first level an initial pointing device click action at a hot zone displays an extended zone anchored at the same corner. The extended zone typically appears as a two-dimensional or three dimensional layered pattern in which each layer is associated with a menu choice, generally represented by a graphical object or icon. The user selects a graphical object in one of the layers of the extended zone, thereby launching a second-level navigation interface at the central menu area. The user may use additional click actions at the extended zones, such as paging through layers or turning over a layer to view additional information, before selecting a given layer (menu choice). In a second multi-click action example, at the second level the user turns over a GUI object in the central menu screen via an initial click action to view information on the other side of the GUI object, then selects the GUI object via a second click action to open a content page.

A preferred user interface layout for interactive televisions includes hot zones at the four corners of the display screen and slider bars at the left and right screen edges, all being control elements for user inputs. The hot zones are typically used for multiple-choice inputs, while the slider bars are used for digital quantitative inputs. The hot zones have associated functions with data sets that can change depending on context. Likewise the slider bars have associated functions with data ranges that can change depending on context. Context changes include for example selection of a multiple choice at one of the hot zones; a change of content displayed at the central display area; selection of a control element in the central display area; concurrent changes of hot zone and slider bar functions; and prescribed click actions of the handheld input device, such as an "exit" input to move back to a prior navigation configuration.

A further aspect of the invention is a "horizon line" graphical user interface control for increase and decrease of a function. In a basic embodiment, the horizon line control comprises a horizon line extending horizontally or vertically across the iTV screen, wherein the location of a user-moveable object (cursor) on one side of the horizon line causes an increase of a controlled function, and cursor location on the other side of the horizon line causes a decrease of the same function. The rate of increase or decrease may accelerate with distance from the horizon line, for example as a linear or (preferentially) logarithmic function of distance. The horizon line may be invisible, visible, or may become visible upon some event such as crossing the horizon line. A rate indicator may depict the rate of increase or decrease. The horizon line control can be interposed over or juxtaposed with another image e.g. as a transparent overlay.

In a more advanced version of the horizon line user interface, horizontal and vertical horizon line controls are used in combination, thereby providing simultaneous increase-decrease control of two different functions. This two-dimensional horizon line control can help the user visualize a coordinated increase or decrease of the level of the controlled functions.

In a further variation, a Z-axis horizon line control is used with the x- and y-axis controls to provide three degrees of control (3D horizon line interface). In one embodiment, the 3D horizon line interface includes a threshold plane and an active plane. The active plane may comprise a user-movable object that can move from a location in front of the threshold plane, to a location behind the threshold plane (or vice versa), in order to change between increase and decrease of a Z-axis controlled function. Depth cues such as linear perspective and size may improve visualization of the Z-axis dimension of control.

In a flexible navigation method according to the invention, the user is given a choice of two or more click actions of the handheld input apparatus with which to effect a given click event. For example, the user may have a choice of either a cursor-based click action or a movement-based click action to effect the same click event. This accommodates users who prefer to use pointing devices, and users who prefer to use motion-sensitive devices. The navigation interface includes a visual cue to both click actions. For example a circular-arrow icon can be coextensive with hot spots that cause a mouse over of the pointing device to effect a given click event; this circular-arrow icon also can prompt the user to make an angular-rotation movement of the motion-sensitive device to effect the same click event.

Another aspect of the invention relates to the use of three dimensional graphical objects and visual settings to facilitate distance viewing of the iTV GUI. The extended zones may display visible three dimensional shapes or textures to facilitate user discrimination of hot zone functions and menu choices. As used herein, "three dimensional" graphical display objects (or shapes or textures) are objects (or shapes or textures) that appear to have an extension in depth. For example, corner steps or other visibly layered structure may identify a multi-layer overlay structure. The central menu area also may display objects with an apparent three dimensional shape or texture, such as polyhedrons or other multi-surfaced objects, and may use object motion and/or apparent change of perspective within a three dimensional space to display different surfaces of the objects. In addition, the central menu area may animate two dimensional forms within three dimensional space, such as by scaling up or scaling down an object to simulate "Z-axis" movement toward or away from the viewer ("zoom" function); by turning a tile, page, or three dimensional object to view a different surface ("turn" function); or by flipping through a stack of tiles or pages ("leaf" function). Interactive television can utilize various visual depth cues such as texture gradient, size, interposition, and linear perspective, which can be based upon aspects of the natural 3D environment that help people to perceive depth. In the iTV navigation interface, such depth cues can act as visual cues that suggest certain click actions or click events.

One three dimensional visual effect combines scaling up objects (zoom in) with an appearance state change comprising a distinctive increase of level of detail. This appearance state change of level of detail is associated with a state change of control function. For example during the state change of appearance, a single unfocused object may resolve into multiple graphical features, each representing a different selection choice.

A further aspect of the invention relates to a method of adapting a web page designed for personal computer interfaces (one foot experience) to a web page that is suitable for distance viewing of interactive television (ten foot experience). Such a web page can serve as the central menu screen in the three-click navigation method. Basic steps for adapting a traditional web page to serve as a content page in the three-click navigation method include:

Identify and extract the essential features of the web page;
Disaggregate these features into data objects, preferably using metadata;
Reformat the data objects (such as tiles, lists, etc) as graphical objects having a form and layout suitable for distance viewing, based upon the design techniques of the invention; and
Revise and reposition text and graphics within the data objects suitably for distance viewing.

Preferably the reformatting of data objects utilizes three dimensional data objects and/or animated data objects. Preferably also the revision and repositioning of text and graphics includes reformatting text and/or detailed graphics in magnified form and/or on multiple surfaces of a three dimensional graphical object. These design rules provide a more uniform look and feel for the navigation interface, whether embodied in an original design, or a web site redesign.

According to an aspect of the invention, a method of selecting content to be displayed on an interactive television includes: displaying a layout the interactive television, wherein the layout includes at least two hot zones in respective corners of the layout; when a user selects a selected hot zone from one of the hot zones using an input device, triggering display of an extended zone corresponding to the selected hot zone, wherein the extended zone is in the corner of the selected hot zone and is larger than the selected hot zone; and when the user makes a selection from the extended zone, displaying in an area of the layout that is not anchored to the hot zone, a menu corresponding to the selection from the extended selection space.

According to another aspect of the invention, a method of controlling an interactive television, the method including: displaying a layout on the interactive television, wherein the layout includes one or more visual cues to prompt a user regarding an action (click action) to be taken on an input device to activate a predetermined function (click event).

According to yet another aspect of the invention, a method of display on an interactive television, the method including: receiving information regarding a web page; extracting text and data objects of selected features of the web page; reformatting the data objects of the selected features of the web page for distance viewing; and arranging the reformatted data objects and other parts of the selected features for display on the interactive television.

According to still another aspect of the invention, a method of controlling a television, the method including: providing a line and a user-movable object (cursor) on a layout displayed on the television; and increasing a control function when the user-movable object is on one side of the line, and decreasing the control function when the user-movable object is on the other side of the line.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It will be appreciated that this application contains a variety of inventive aspects of many different types. References herein to "the invention" or otherwise to inventive aspects should not be considered as limiting in any way. For example such a reference should not be interpreted as requiring a feature or features as being necessary. Rather the claims stand on their own, whether or not they recite any or all of the features described below as associated with "the invention."

BRIEF DESCRIPTION OF THE DRAWINGS

FIG. 13B is a lower perspective view of a handheld input apparatus.

DETAILED DESCRIPTION

A method of selecting content for display on an interactive television may involve a multilevel selection process that includes selectable hot zones, for example in corners of a graphical user interface, and a central menu area. Selection of a hot zone may cause an increase in size or extension of the zone, prompting a further selection. This may lead to a display of content items in a central menu, with the user selecting content for display from the central menu.

A method of controlling an interactive television includes displaying a layout on the interactive television that includes one or more visual cues to prompt a user regarding an action (click action) to be taken on an input device to activate a predetermined function (click event). The visual cues may include multiple visual cues, at least one of which is a visual cue for a cursor-based action that includes positioning a cursor with an input device, and another is a visual cue for a movement-based action that includes moving the input device.

A method of display on an interactive television includes receiving information regarding a web page, extracting text and data objects of selected features of the web page, reformatting the data objects of the selected features of the web page for distance viewing, and arranging the reformatted data objects and other parts of the selected features for display on the interactive television. The method may result in a reconfiguration of a web page from one more appropriate for display on a computer to one more appropriate for display on an interactive television.

A method of controlling a television increasing a control function when a user-movable object is on one side of a line displayed on a layout, and decreasing the control function when the user-movable object is on the other side of the line. The method may involve movements in one, two, or three dimensions.

Figure 1:
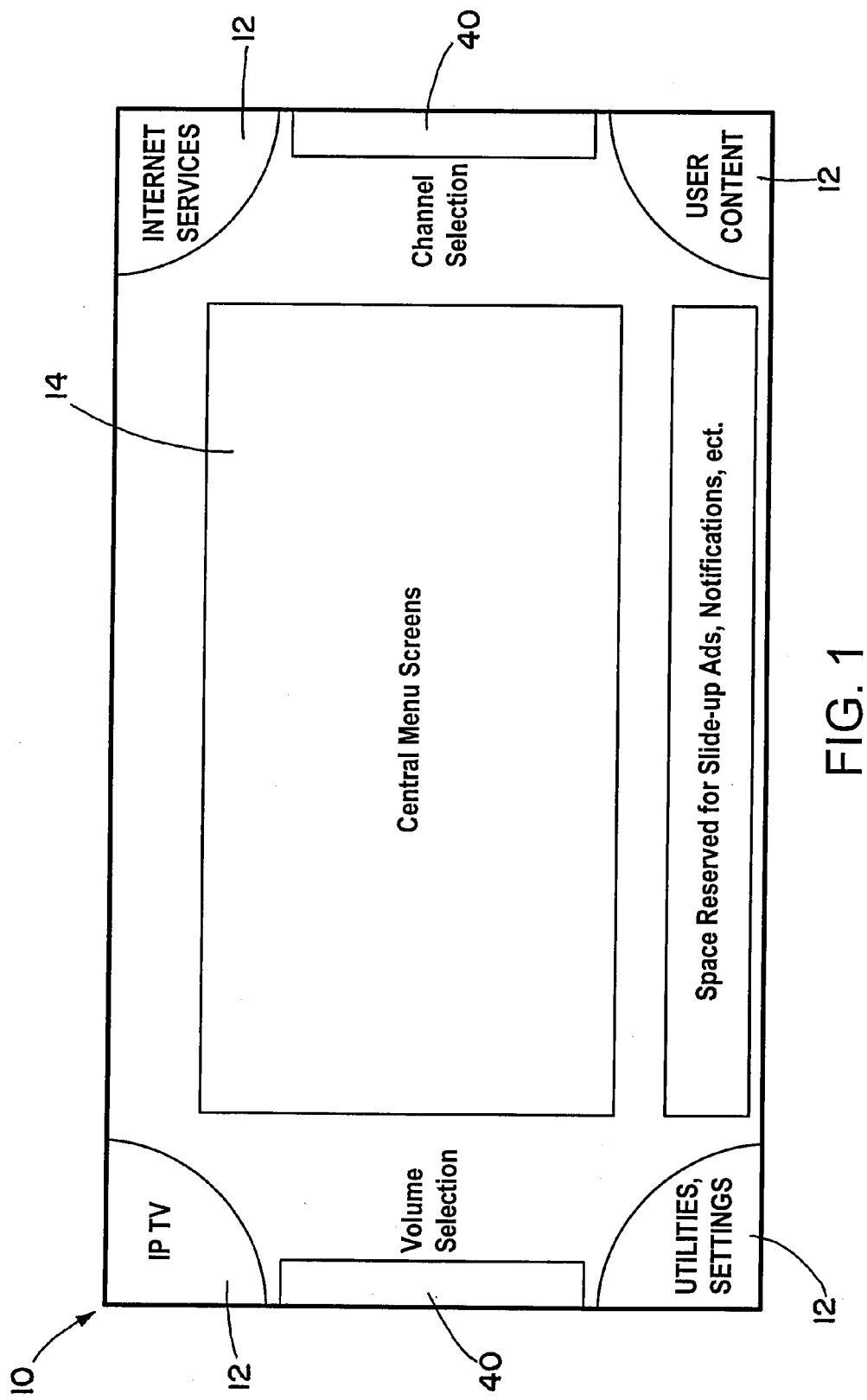
FIG. 1 is a plan view of the basic design layout of an iTV navigation interface.

FIG. 1 shows a basic screen layout 10 of a graphical user interface for interactive television (iTV). The iTV GUI comprises a screen layout 10 with a series of hot zones 12 located at various corners of the iTV screen, preferably all four corners. A hot zone 12 is an area of active pixels of the iTV display that responds to a mouse cursor associated with a pointing device. A second principal component of the screen layout is a central menu screen 14. The central menu screen 14 displays two-dimensional and three dimensional graphical user interface objects (not shown in this view) that serve as prominent on-screen selectors suitable for distance viewing of the iTV.

Figure 2:
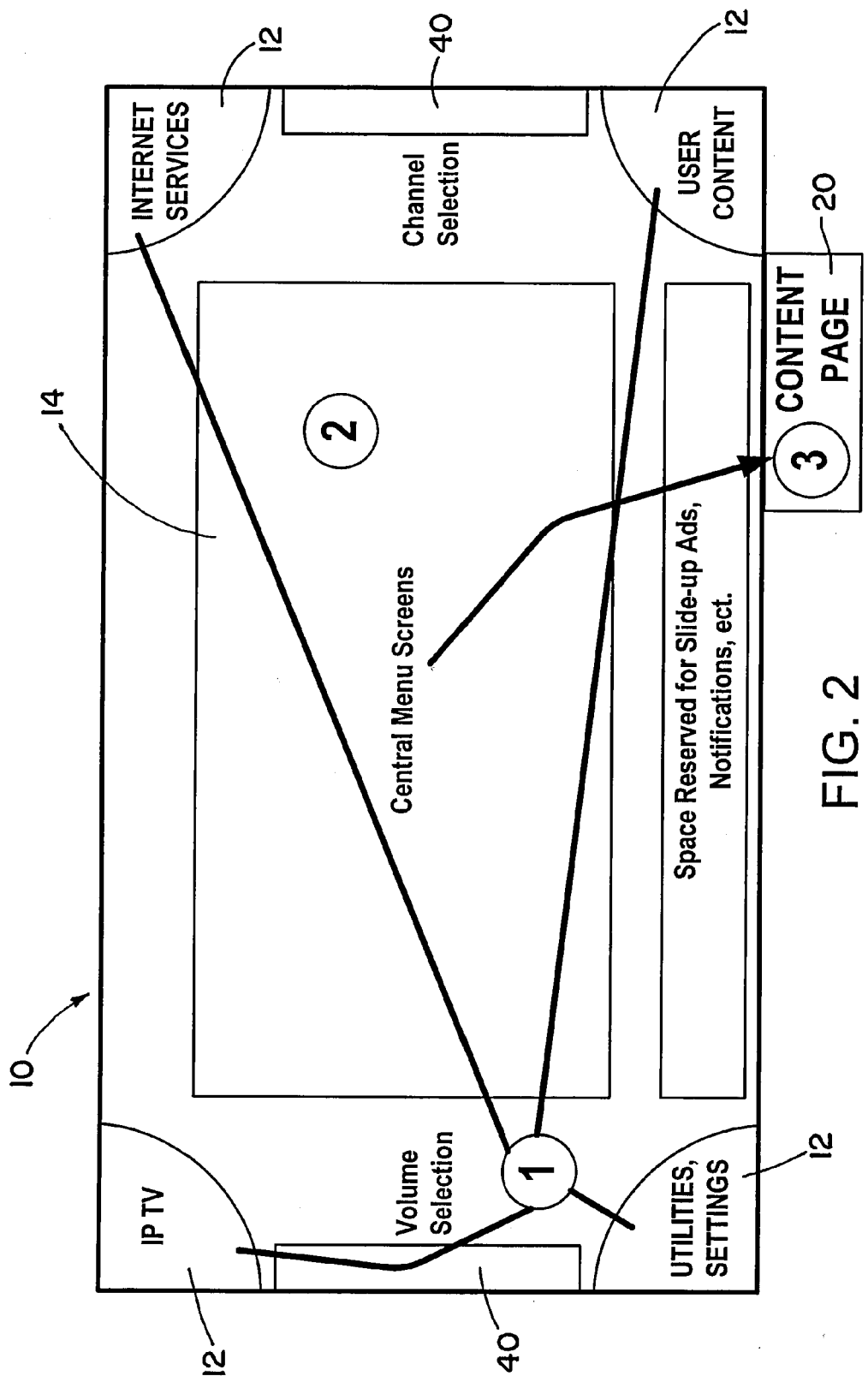
FIG. 2 a further view of the basic design layout, showing the three-click navigation method.

The navigation method of the invention uses an efficient sequence of user actions based upon the screen layout 10 of the invention, as shown in FIG. 2. The user interface of the invention employs a logical structure that avoids the need for excessive user actions; in many cases the user can use three click actions to reach desired content. In the preferred navigational method of the invention, the user selects a function from one of the corner hot zones 12 (level ①) of the navigation interface). This is the first click event. The first click event causes the display of a menu or other GUI objects in the center menu screen 14 (level ②). Selecting from an on-screen selector in the menu screen displays or links to a content page 20—the second click event. For viewing convenience in FIG. 2 the content page 20 (level ③) is shown below rather than overlaid over the main screen 14. The content page 20 enables the user to access desired content such as audiovisual works, ecommerce web sites, social networking web sites, user created content, etc. The content page 20 may for example be a structured markup page such as a web page and may be accessed by in-line linking to a URL, by an RSS feed, by loading a PC application, by opening a local file, etc. In the third click event, the user displays, plays, orders, or otherwise obtains desired content from the content page 20.

Click Actions and Click Events Using Handheld Input Apparatus

In the interactive television user interface of the invention the viewer uses a handheld input apparatus to effect a "click action". A user-effected click action causes a "click event", which is an event-based programming response of the iTV such as displaying a locally stored menu screen at the central menu screen area, launching an application, or linking to a web site. The handheld input apparatus makes use of two types of click action. In the first type of click action, the handheld input apparatus includes a pointing device or mouse with which a user moves a mouse cursor on the iTV display. A cursor-based click action is effected while the mouse cursor coincides with one of the edge-area hot zones, or when the mouse cursor coincides with a hot spot within the central menu area. A second type of click action utilizes a motion-sensitive device. The motion-sensitive device senses a user motion, i.e. translation or rotation, providing input to the graphical user interface based upon the sensed motion.

Examples of the first type of click action include depressing the button of a pointing device while the cursor is located within one of the hot zone or hot spots, and a "mouse-over" in which the user moves or hovers (holds for a predetermined length of time) the cursor over one of the hot zones or hot spots. In the second class of click action, the motion sensor can be programmed to associate given translational or rotational movement of a motion-sensitive device with pre-assigned user interface events. Examples of the second type of click action include a given angular rotation of the motion-sensitive device, a vertical "hammer" movement, and forward and reverse translational movements.

In the preferred embodiment, the pointing device and motion-sensitive device are combined in a single hand held input apparatus, such as a wand that is moved by the user in air as contrasted to the user's movement of a computer mouse on a desktop or other flat surface. FIGS. 12 and 13 illustrate a preferred hand held input apparatus combining the functions of pointing device and motion-sensitive device, as discussed in more detail below.

Hot Zones

In the basic navigation method, the hot zones 12 act as a first level of the iTV graphical user interface. By moving the mouse cursor into one of the hot zones with a button-click or mouse over click action, the user selects a category associated with one of the corner hot zones—level ①. This click action launches GUI objects corresponding to that category at the central menu area 14—level ② (FIG. 2). The "hot zones" and the central menu area do not overlap, i.e. an active pixel area ("hot spots") in the central menu screen cannot coincide with one of the hot zones. The hot zones 12 are permanently active pixel areas at the screen corners, whereas the hot spots in the central menu area are pixel areas that are active only at certain states of the navigation interface. Typically the hot spots 12 are activated upon opening an application or web page at the central menu screen.

The hot zones 12 may be invisible areas of active pixels at the screen corners that may display visible content upon a mouse click or mouse over. Alternatively, the hot zones 12 may comprise visible two dimensional or three dimensional colors, textures, or patterns. These visual attributes can help users identify given menus without having to read hot zone text, and can alert users to a change of hot zone data assignments in cases in which the hot zones content varies depending on context. The hot zones 12 are generally limited in size, as they do not convey extensive information to the user but merely serve as launching zones anchored at the screen corners. The hot zones 12 may take a variety of shapes, preferably regular shapes that include the edges adjacent the respective screen corners. In the embodiment of FIG. 1, the hot zones 12 are quarter-circles that are color-coded to associated categories IP TV, Internet Services, User Content, and Utilities/Settings.

Figure 3A:
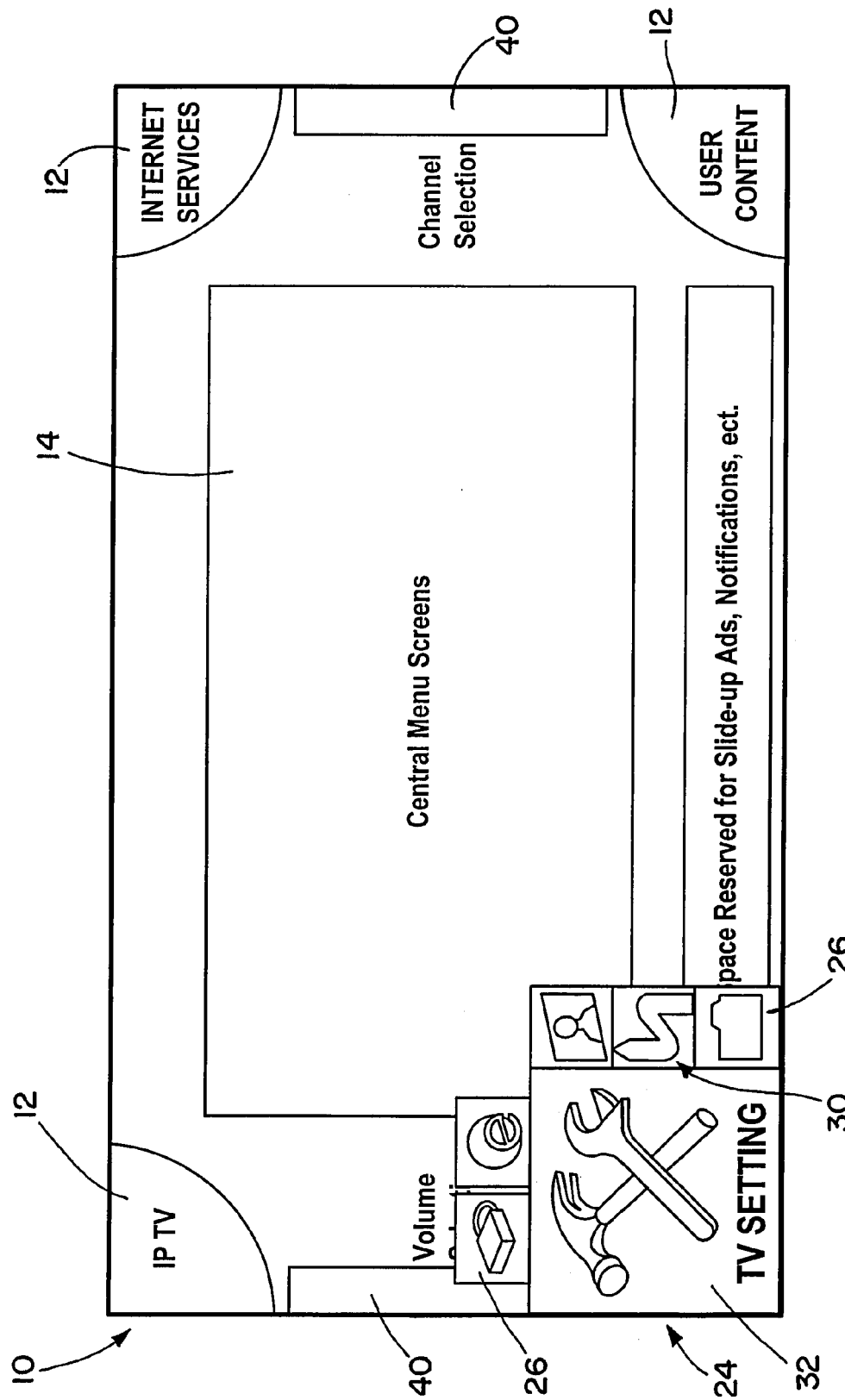
FIG. 3A is a view of the basic design layout, showing a multi-layer extended zone at one of the hot zones.
Figure 3B:
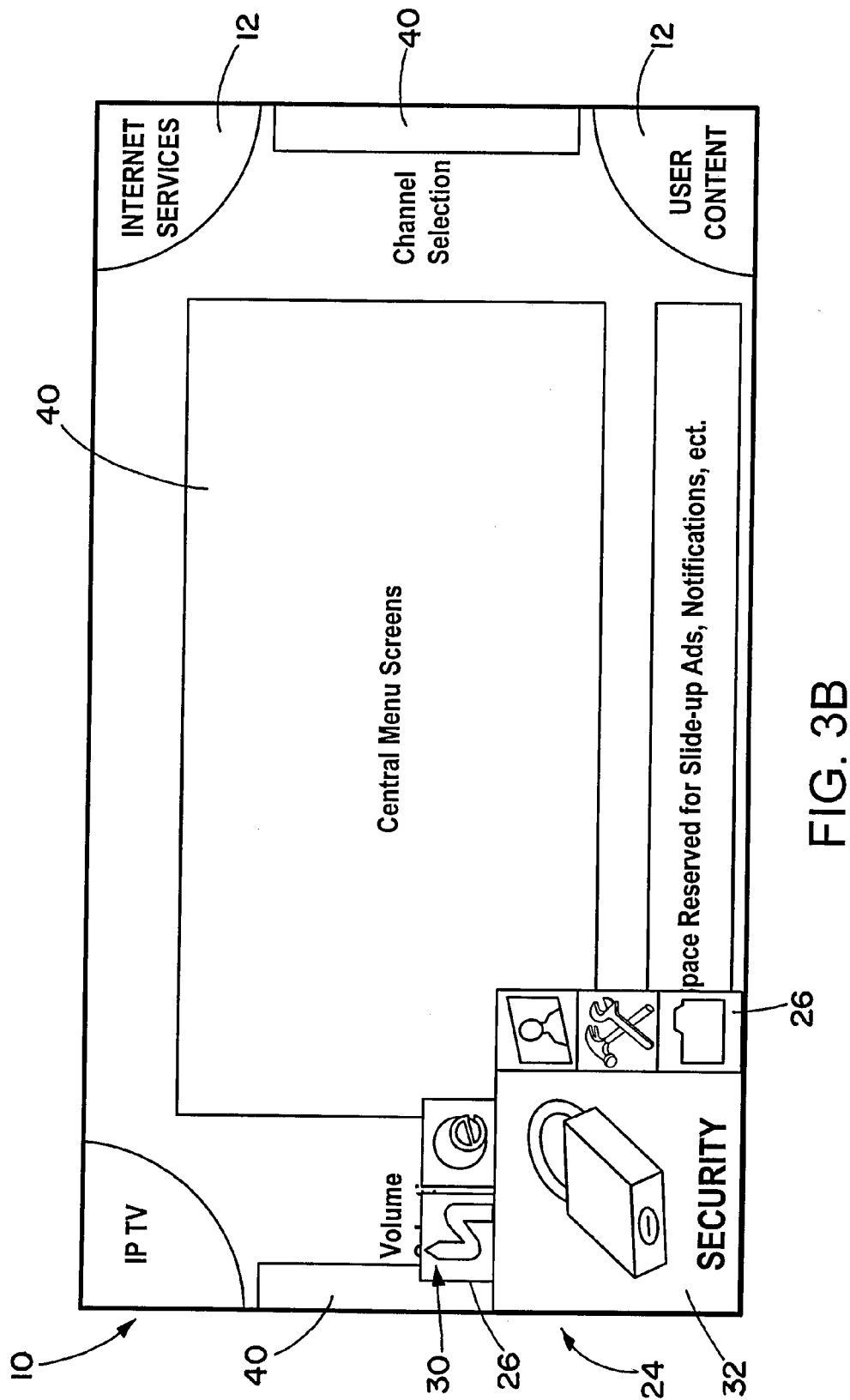
FIG. 3B is a view of the basic design layout, showing the extended zone of FIG. 3 with an alternative active layer.

The GUI objects of the preferred navigation layout also include an "extended zone", a GUI object that includes one or more active pixel area, wherein the extended zone like the corresponding hot zone is anchored at one of the screen corners. FIGS. 3A and 3B show examples of extended zones 24. An extended zone 24 may appear in response to a pointing device click action (button click or mouse over) at one of the hot zones, and contains a series of activated pixel areas typically arranged in layers. Unlike the permanently active pixels of the hot zones 12, the activated pixel areas of the extended zones 24 are temporary and may overlap the central menu screen 14. The extended zones 24 are generally larger and display more information (graphics and text) than the hot zones 12.

The extended zone 24 of FIGS. 3A and 3B includes five layers corresponding to Users, TV Setting, Network Settings, Security, and File Management functions. The extended zone 24 appears as a rectangular stack of layers each including a tab 26 projecting from the stack. Each tab 26 includes an icon identifying the associated function, except for the tab 26 of the uppermost (active) layer which includes a "winding road" navigation icon 30 (this icon is discussed below at "Alternative Click Actions Prompted by Visual Cue"). The active layer 32 displays its icon in enlarged form, with the name of the function. Thus in FIG. 3A, the TV Setting layer is active, i.e. a mouse click or mouse over within the enlarged icon selects the TV Setting function thereby opening GUI objects relating to TV Setting in the central menu screen. In FIG. 3B, the security function is active.

In the extended zone of FIGS. 3A and 3B, the user can switch active layers 32 in the extended zones 24 by pointing at the tab 26 of the desired layer. Alternatively, the user can point at the "winding road" navigation icon 30 at the tab 26 of the active layer 32, causing the graphical user interface to flip through the layers (the "leaf" function, discussed below). When a desired function is active, the user can select that layer. A forward-backward-forward horizontal motion of the motion-sensitive handheld apparatus will cause this same click event of flipping through the extended zone layers.

The extended zones 24 differ from known GUI tools such as task bars and cascading menus in their use of graphical images that are designed for distance viewing. Unlike task bars and cascading menus, the preferred extended zones 24 comprise layered structures that extend beyond the hot zones 12 but still retain the hot zones' character of corner GUI features. The extended zone 24 can use various visual attributes to distinguish layers, such as color coding and icons (as in FIGS. 3A and 3B), shape and texture. Each icon is associated with its menu option. Preferably the extended zone 24 uses a visual format that is visually associated with the screen corner, for example, a 3D simulation of a layered structure extending from the screen corner.

An extended zone 24 is launched by activating a hot zone 12 and is anchored in the corner that anchors that hot zone 12. As shown in FIGS. 3A and 3B, the extended zones 24 may overlap the central menu area 14 and may have active pixels in this area. However when GUI objects are launched in the central menu screen 14 (transition to level 2), the extended zones 24 become inactive.

In addition to their primary function as a launching point—the first level of the iTV's navigation interface—the hot zones 12 may be used at the second and third levels of the navigation interface. In this case, the hot zones' data assignments, and data sets of any associated extended zones, may change depending on the state of the navigation interface in the central menu area. The navigation interface may provide a visual indication when the hot zone data assignments change.

Preferably as seen in FIGS. 1 and 2, the navigation layout also includes slider bars 40 at the screen edges, GUI controls that are used for digital quantitative inputs such as for volume selection for audio content and channel selection for television programs. The slider bars 40 are discussed below.

Figure 4:
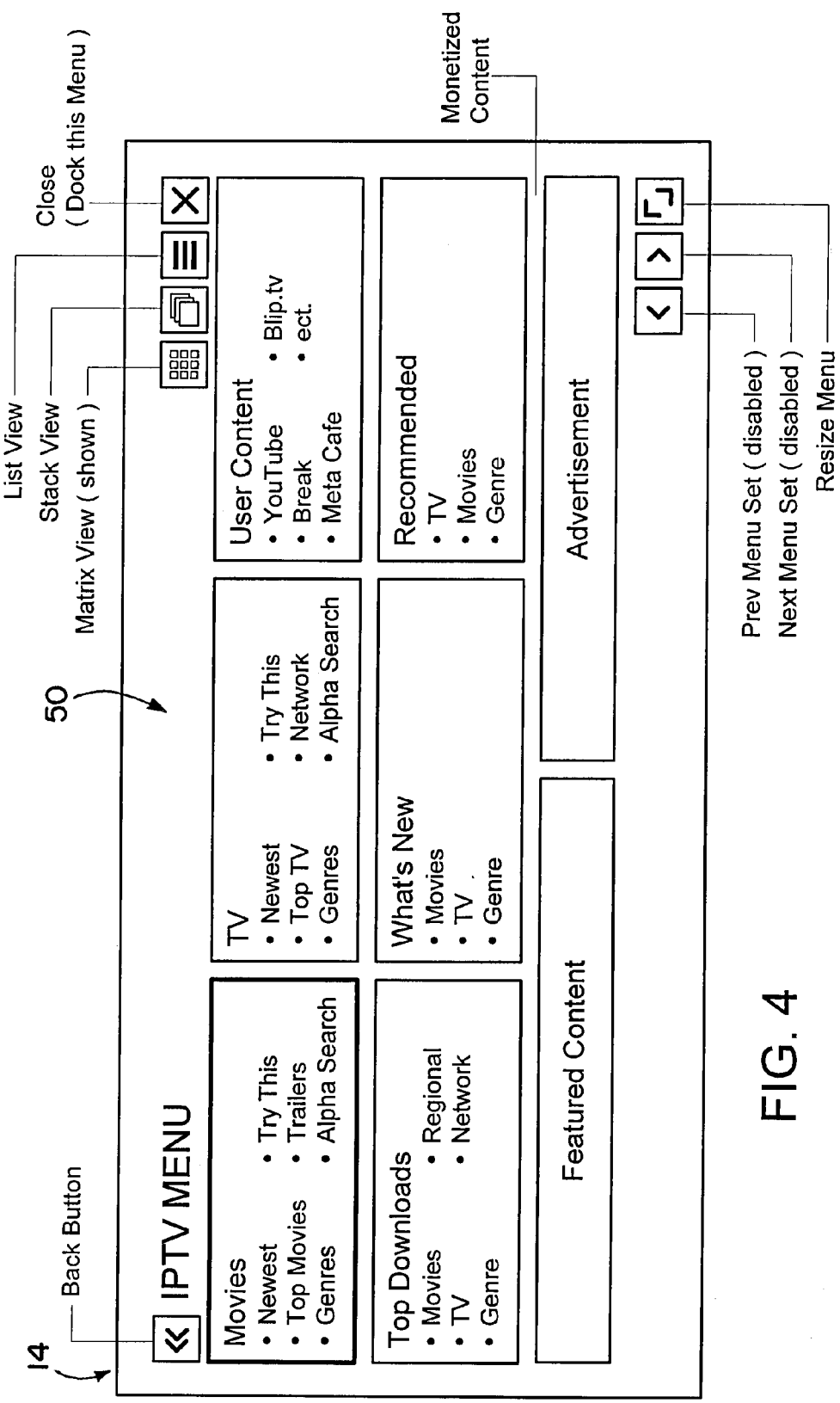
FIG. 4 shows IP TV menu functions displayed in matrix view in the central menu screen.
Figure 5:
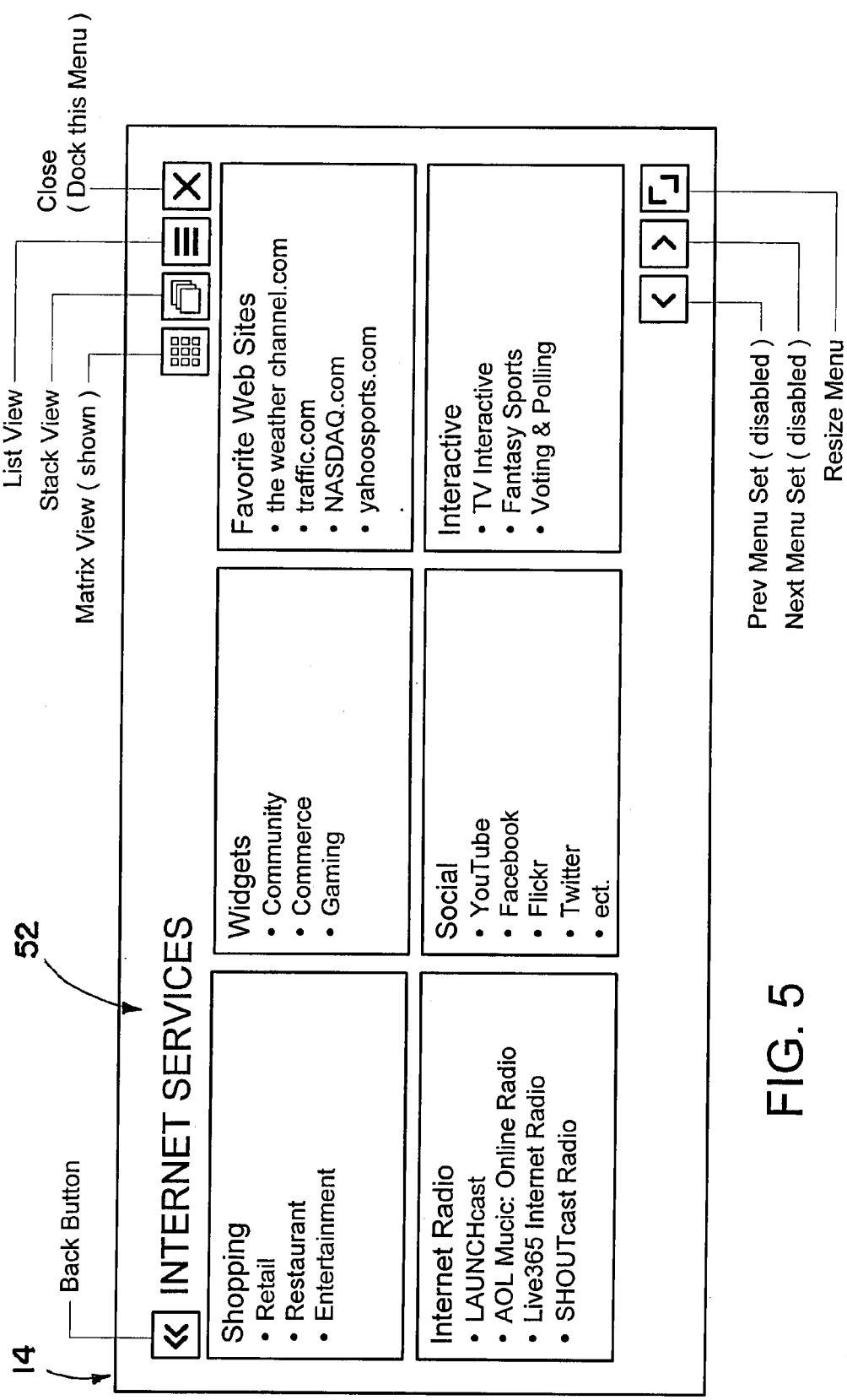
FIG. 5 shows Internet Services menu functions displayed in matrix view in the central menu screen.
Figure 6:
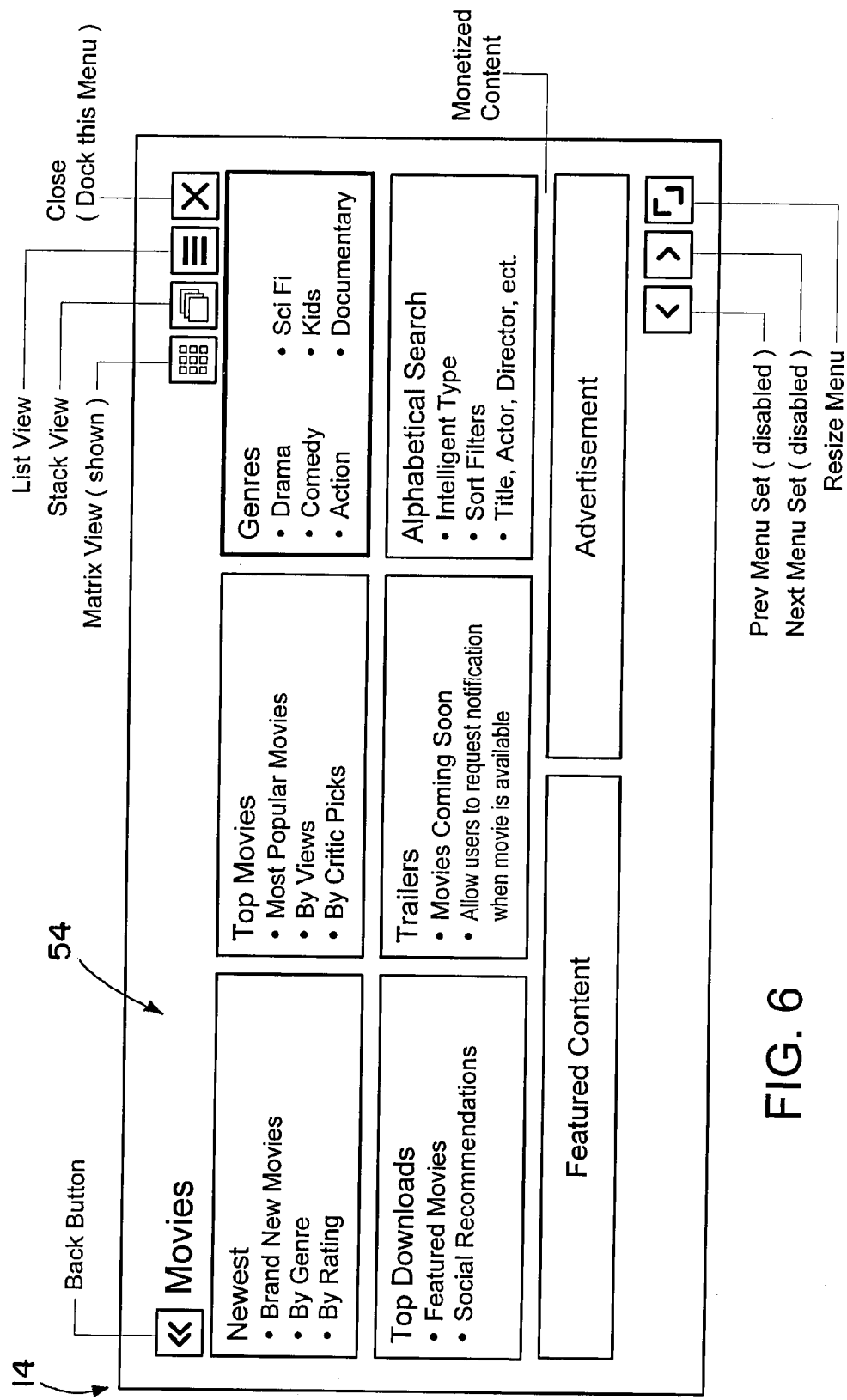
FIG. 6 shows Movies sub-functions of IP TV displayed in matrix view in the central menu screen.
Figure 7:
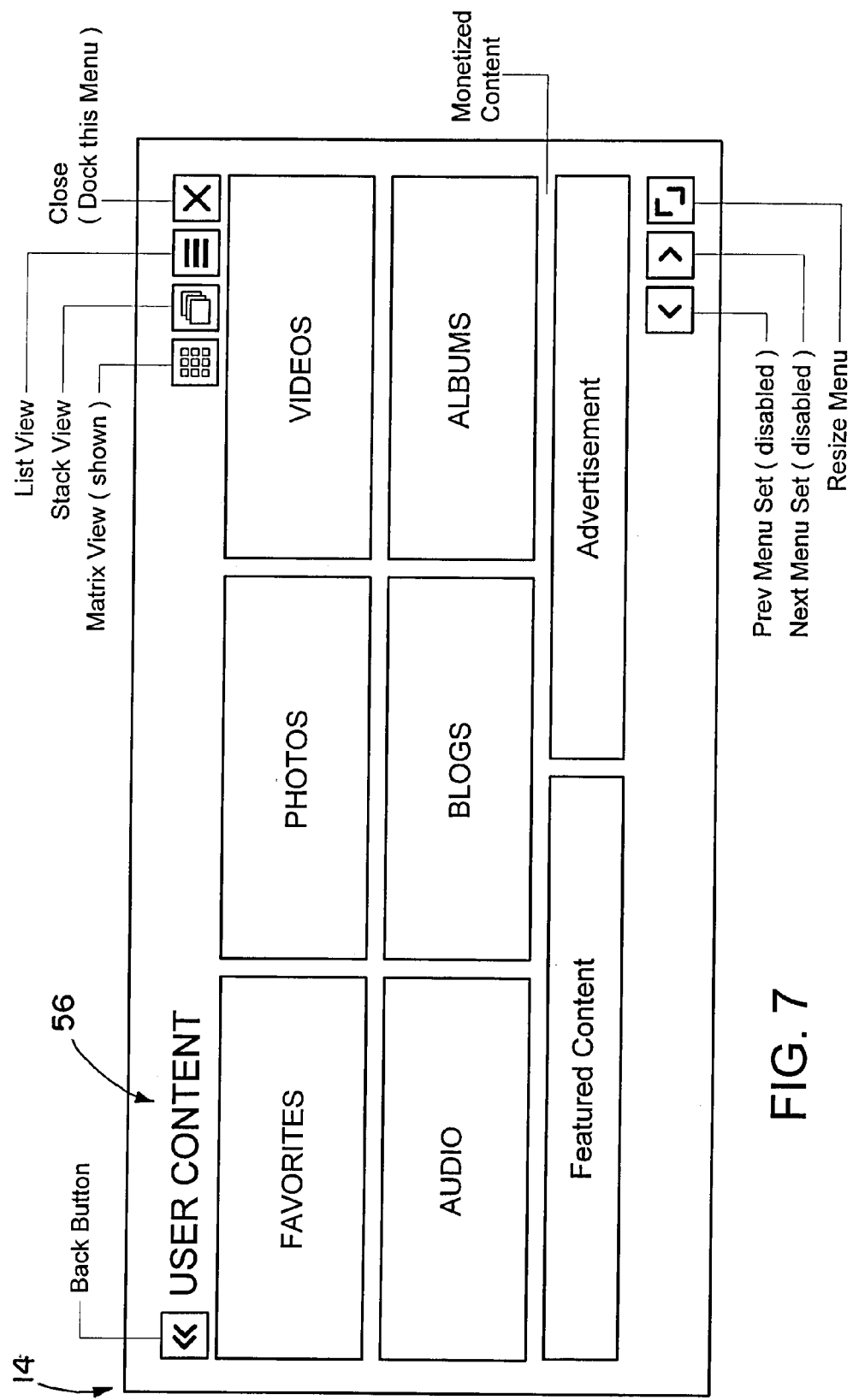
FIG. 7 shows User Content menu functions displayed in matrix view in the central menu screen.
Figure 8:
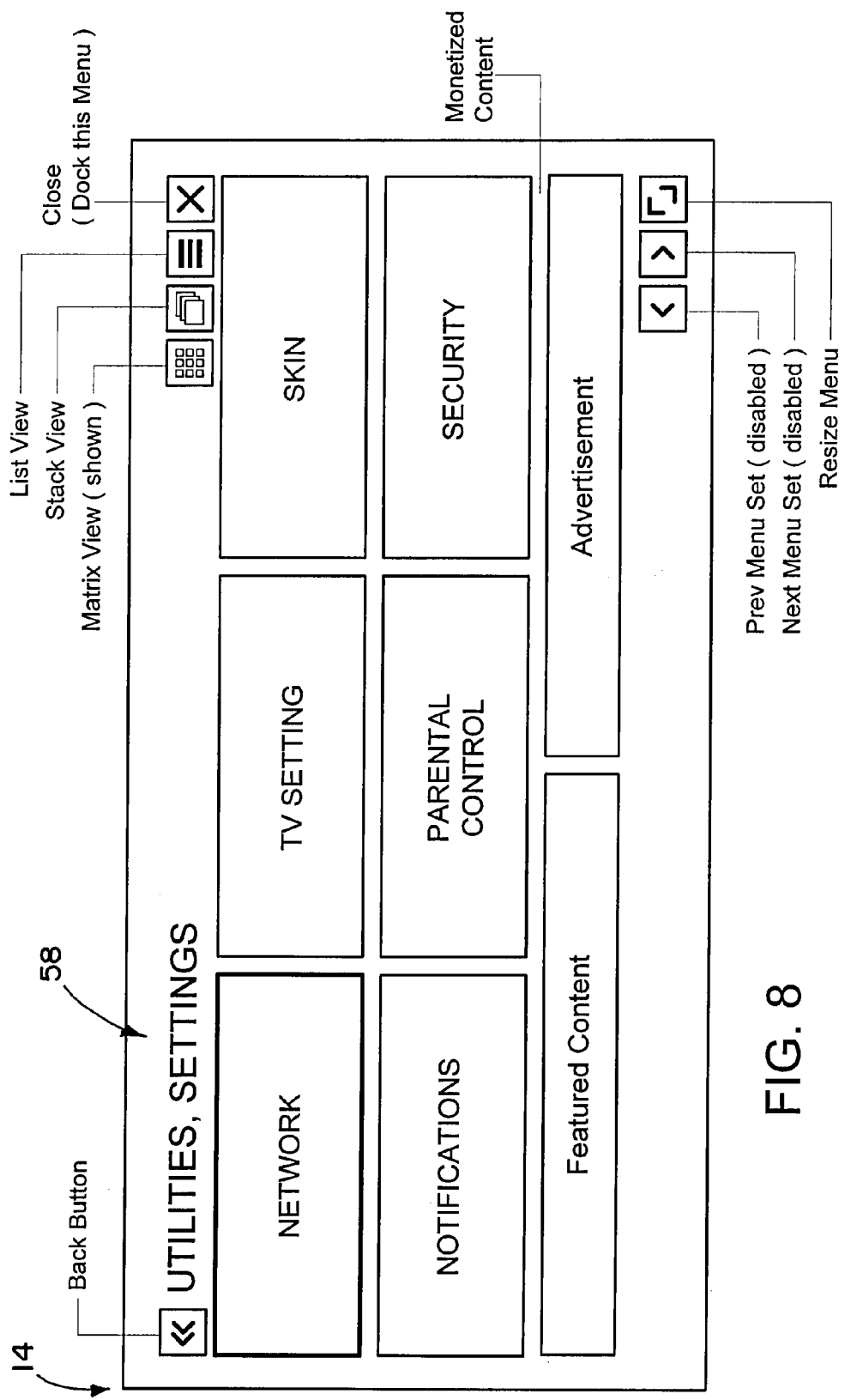
FIG. 8 shows Setup menu functions displayed in matrix view in the central menu screen.

Central Menu Screen—Three Dimensional Graphical User Interface for Interactive Television FIGS. 4-8 show various hot zone menu items opened as tiles in the central menu screen 14. FIG. 4 shows an IP TV Menu 50, which includes selectable items (such as GUI objects or elements) for Movies, TV, User Content, Top Downloads, What's New, and Recommended. FIG. 5 shows an Internet Services menu 52, which includes selectable items (such as GUI objects or elements) for Social, Widgets, Internet Radio, Favorite Web Sites, Shopping, and Interactive. FIG. 6 shows a Movies Menu 54, which includes selectable items (such as GUI objects or elements) for Newest, Top Movies, Genres, Try This, Trailers, and Alphabetical Search. FIG. 7 shows a User Content Menu 56, which includes selectable items (such as GUI objects or elements) for Favorites, Photos, Videos, Audio, Blogs, and Albums. FIG. 8 shows a Setup Menu 58, which includes selectable items (such as GUI objects or elements) for Network, TV Setting, Skin, Notifications, Parental Control, and Security.

Advantageously, the GUI objects in the central menu screen may be coordinated visually and logically to facilitate user navigation between levels of the navigation interface. The menu items of FIGS. 4, 5, 7, and 8 are matched to the hot zone categories of FIG. 1. These menu screens may be coordinated visually with the respective hot zones using color coding of the hot zone categories. All GUI elements of FIGS. 5, 7 and 8 may be color coded to match the corresponding hot zone category, while FIG. 1 shows an example of mixing hot zone categories at the menu screen (in this case, including User Content items in the IP TV menu screen to permit users to play personal content). Other graphical techniques can be used to coordinate between the first and second levels of the navigation interface such as shapes, textures and icons. In the navigational hierarchy shown in FIGS. 1, 4-8, the menu screens of FIGS. 4, 5, 7 and 8 are at the same level of the hierarchy as the hot zone categories of FIG. 1, while the Movies Menu 54 of FIG. 6 is a sub-level under the IP TV category.

Figure 9:
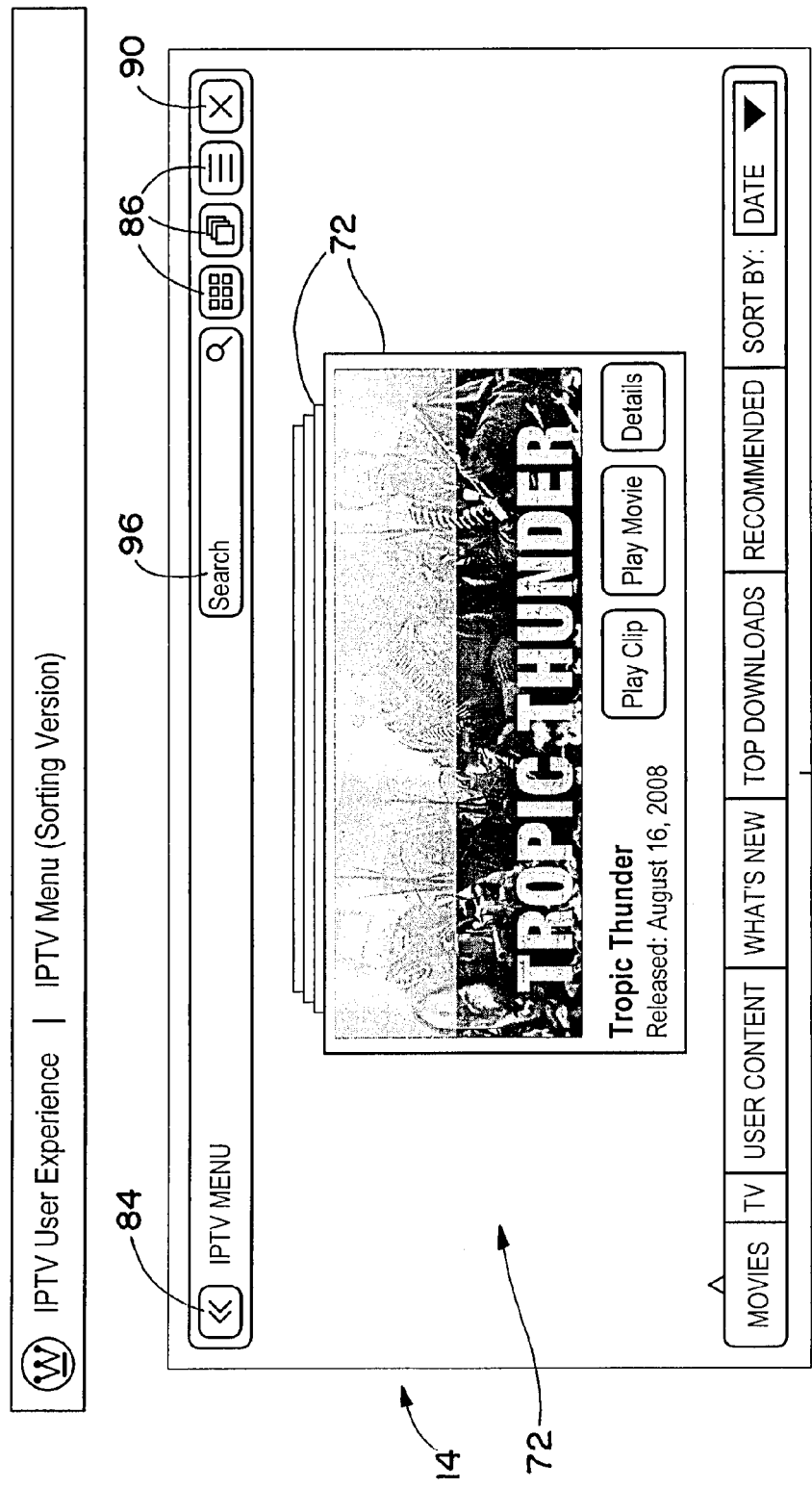
FIG. 9 shows a display screen of IP TV search results, in stacked view.
Figure 10:
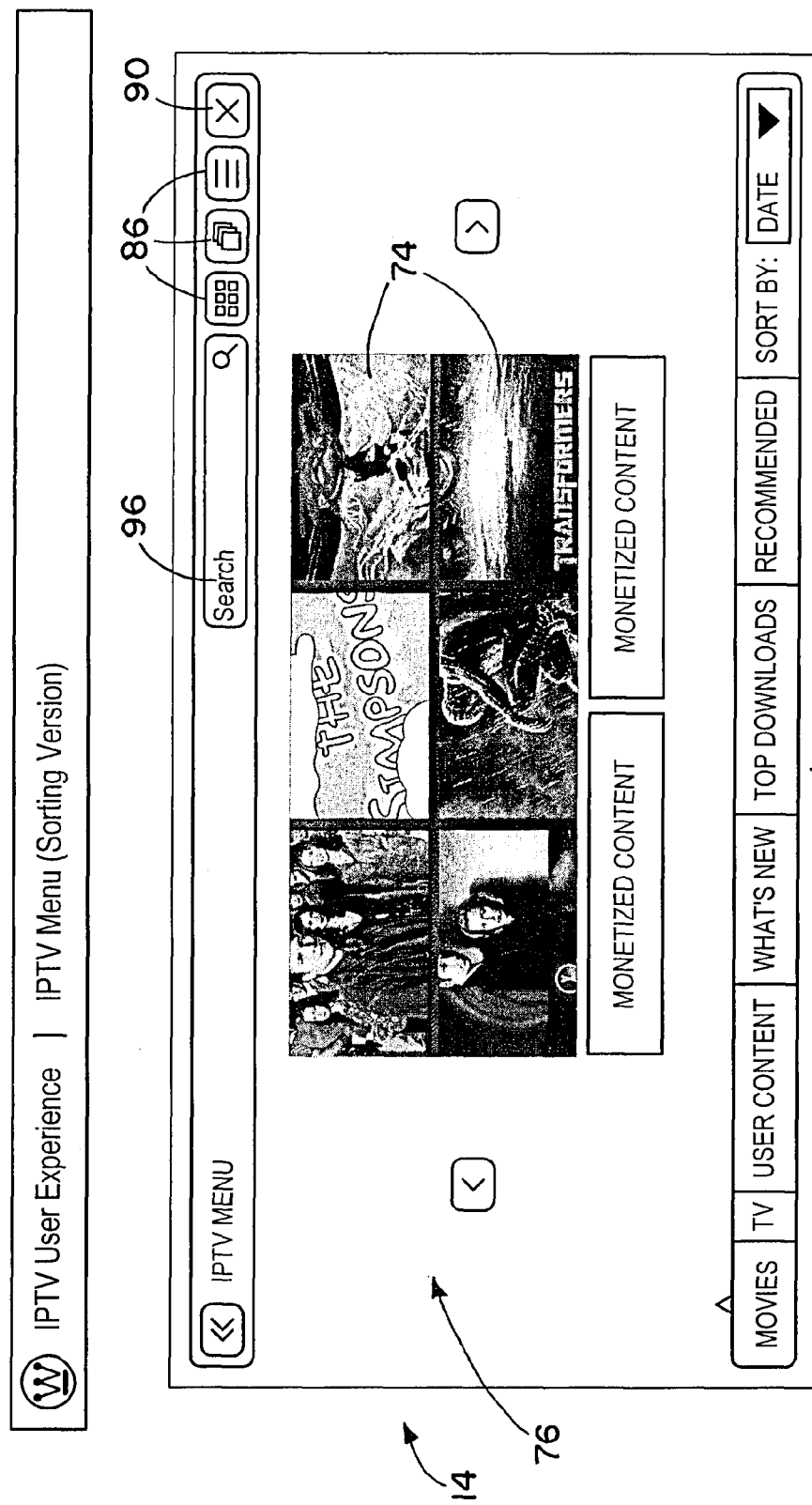
FIG. 10 shows a display screen for IP TV search results, in matrix view.
Figure 11:
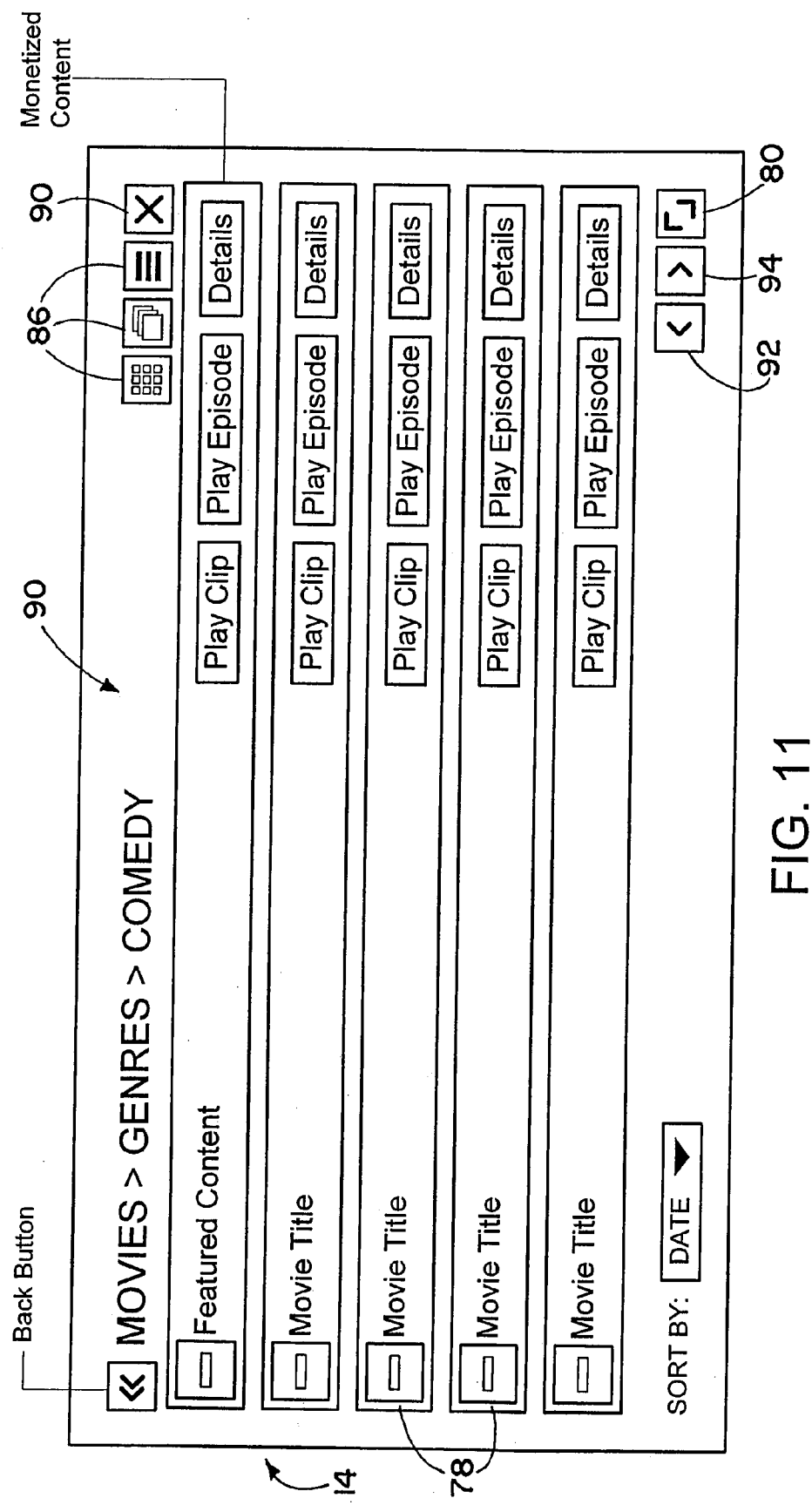
FIG. 11 shows a display screen for Movies search results, in list view.

The central menu screen 14 can use a variety of layouts with two dimensional and three dimensional graphical user interface objects. Traditional two-dimensional layouts include tiles arranged in a matrix, stack, or list. FIG. 9 shows a layout of two-dimensional tiles 70 in a stacked view 72. FIG. 10 shows a layout of two-dimensional tiles 74 in a matrix view 76. FIG. 11 shows a layout of two dimensional tiles 78 in a list view 80. Although these views are largely two-dimensional in nature, they can be combined with three dimension effects through animation creating apparent motion of the tiles in space, as discussed below. FIGS. 9-11 also illustrate GUI control elements including a back button 84; view type selectors (matrix, stack, list) 86; a resize menu 88; a close menu 90; a next menu set 92; and a previous menus set 94. This central menu screen layout 14 (of any of the various types) may also include an alphabetical search element 96.

A commonly used hot zone menu is IP TV, the selection of which enables the users to select streamed and broadcast television programs, movies, and other video content. In a preferred version of the three-click user interface for interactive television, the traditional television function of entertainment is expanded to also include other uses such as shopping (concierge function), social networking, widgets (e.g. clock, calendar; finance), and user content. In addition the iTV permits convenient user adjustment of settings and device inputs (e.g. TV, HDMI, VGA, USB, etc). The hot zone categories may be customized by the system designer to provide different menu screens for these iTV functions.

Figure 15:
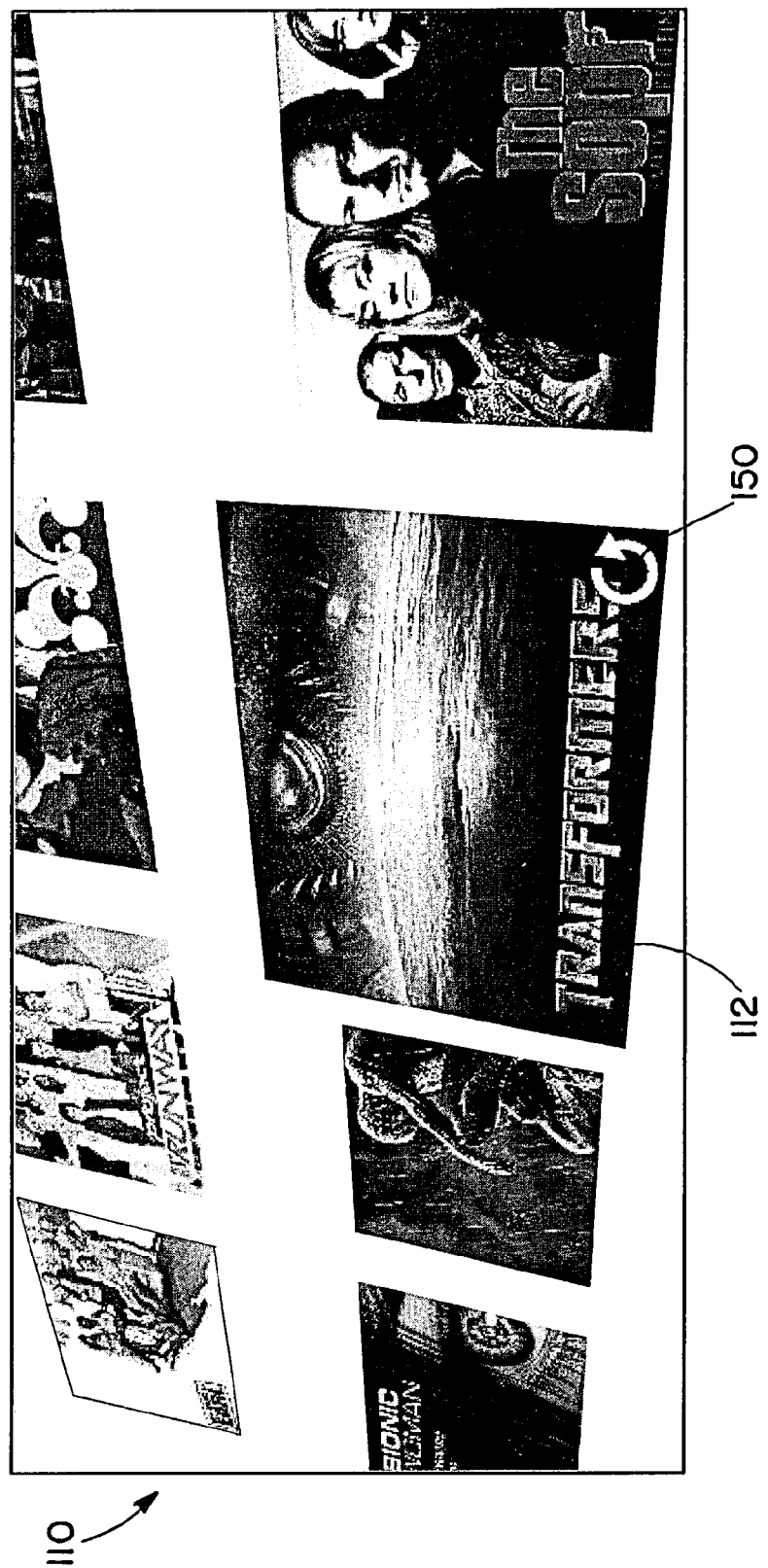
FIG. 15 shows IP TV menu functions displayed in a three-dimensional matrix view in the central menu screen, illustrating the zoom function and a turn-function navigational icon.

In a preferred embodiment, the navigation interface spatial design is three-dimensional. By this it is meant that the navigational interface spatial design gives the illusion or feel of navigating in a three-dimensional space, although of course it will be appreciated that only two dimensions are displayed on the screen. The navigation interface can use three-dimensional icons and other 3D imagery for richer user interaction. The use of three-dimensional imagery facilitates user viewing in the ten-foot experience. For example, users may navigate through three-dimensional space from multiple points of view, such as multi-surfaced icons that display information on different surfaces. In addition, the navigation interface can animate two dimensional graphical objects in three dimensional space. Users can thereby manipulate the objects in various ways to display graphical features or textual information. Examples of these manipulations include:

"turn"—turning a tile, page or other object to view information on another surface, such as the opposite side of one of the tiles in the matrix view 76 of FIG. 10;

"leaf"—paging through a stack of objects or a multi-layered object, such as the tiles in the stack view 72 of FIG. 9, or the extended zone layers of FIGS. 3A and 3B;

"zoom"—changing the scale of objects e.g. scaling up an object to view additional graphical detail or larger sized text, such as the central tile 110 in the matrix view 112 of FIG. 15.

These animation functions also can be applied to three dimensional graphical objects. Applications of the turn, leaf and zoom functions to three dimensional graphical objects are discussed below with reference to FIGS. 22 and 23.

The invention uses visual metaphors that are well known and familiar from every day life to guide viewers through the navigation interface, helping to relate user actions to desired results. Visual metaphor examples are described below at "Alternative Click Actions Prompted by Visual Cue" and at "Scale up of 3D objects with appearance state change (Level of Detail)".

Visual cues also can be used in flat displays to provide users with perception of depth. In a natural 3D environment, people rely on many aspects of the environment that help them to perceive depth. Adding a sense of depth to a flat display involves simulating these visual cues on the display terminal. Herein such visual cues that provide users with perception of depth are called depth cues.

One category of depth cues is color or texture cues, which help people to perceive depth based on differences in object colors or texture. Well known examples include object shading, and texture gradient. A second category of depth cue is size cues, in which the apparent size of the object indicates its distance from the viewer. Well known types of this depth cue include relative size (based upon differences in image size that the object produces on the retina) and known size (in which the viewer takes into account previous knowledge of the actual size of objects).

A third category of depth cue is position cues, which give depth information based on where the object is located. One such depth cue is interposition, in which one object is partially occluded by another, and it is assumed that the second is the closer object. Another case of position cues is linear perspective, a form of perspective in which parallel lines are represented as converging so as to give the illusion of depth. A further type of position cue is stereopsis, which depends upon a viewer's eyes being separated from each other, each eye receiving a different image of a scene. In stereopsis, a viewer perceives these two retinal images as a single three dimensional image, and can determine depth by comparing the retinal images and noting the differences.

In addition to the above categories of depth cues, which all deal with stationary objects, a fourth category of depth cue is motion parallax, which deals with object movement. Motion parallax refers to a change of angular position of two observations of a single object relative to each other as seen by a viewer, caused by the relative motion of the viewer.

Various imaging techniques develop illusionary effects which, broadly speaking, manipulate a monocular or two-dimensional image in such a way that an illusion of three-dimensionality is perceived by the viewer. Two major factors that contribute to the perception of depth are parallax (resulting from the separation of the two eyes), and perspective (characterized by the representation of three-dimensional objects and depth relationships on a two-dimensional surface). The impact of parallax upon three-dimensional perception diminishes rapidly with distance. Television watching at distances of ten feet and higher can be considered distance viewing, which is amenable to three dimensional visual effects. Objects that provide a strong impression of three dimensions can provide compelling visual cues in an interactive television system.

Figure 22:
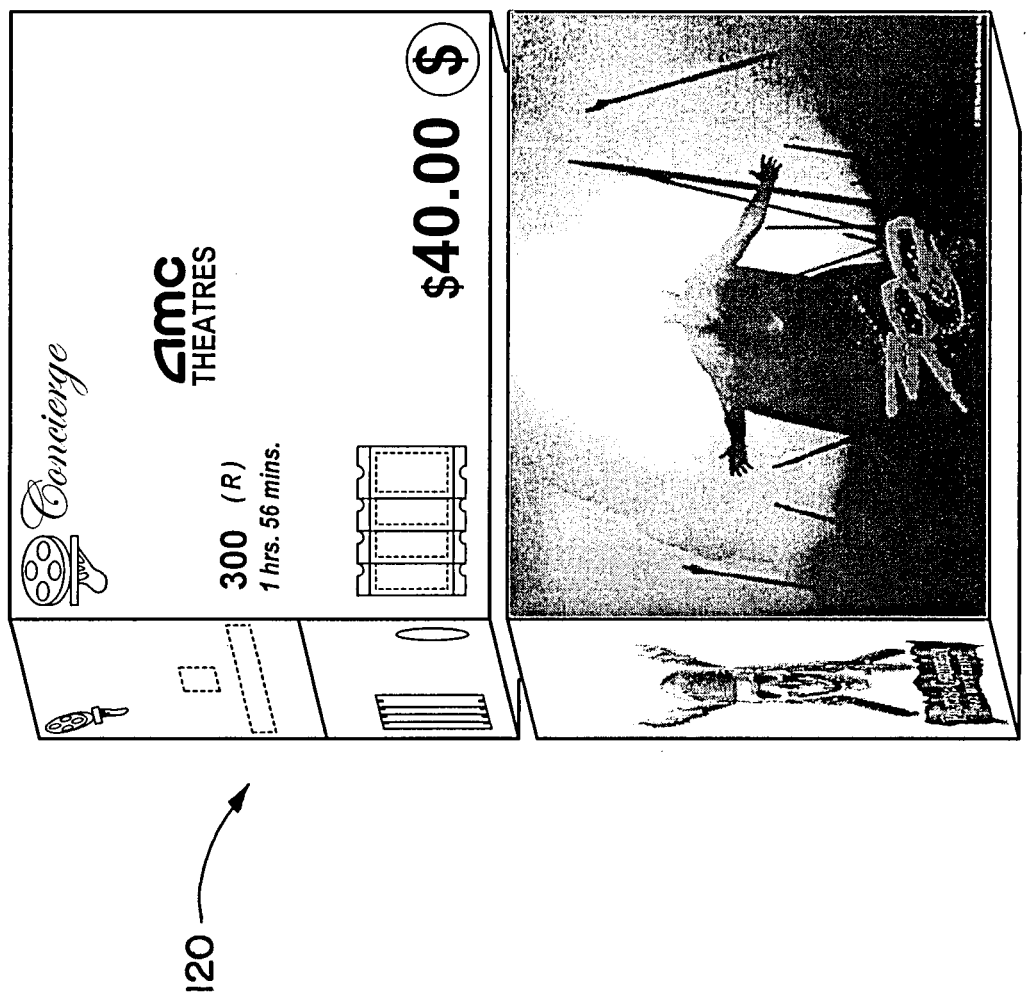
FIG. 22 is a simulated 3D view of a cuboid displaying Concierge content.

FIG. 22 shows an example of a polyhedron 120, one of a group of polyhedra (three dimensional bodies bound by faces) with different GUI images on different faces or surfaces of each polyhedron. The polyhedron 120 of FIG. 22 is a cuboid, i.e. a parallelepiped in which each face is a rectangle. The group of cuboids could display views relating to the concierge function as applied to cinema entertainment, which is described in greater detail below, with (for example) the upper part of cuboid displaying information about a particular theater, schedule, ticket prices, etc. and the lower part of the cuboid displaying stills of movies playing at a chosen theater. The user can apply the GUI's turn function to rotate a cuboid, and the zoom function to scale up a surface of interest.

Figure 23:
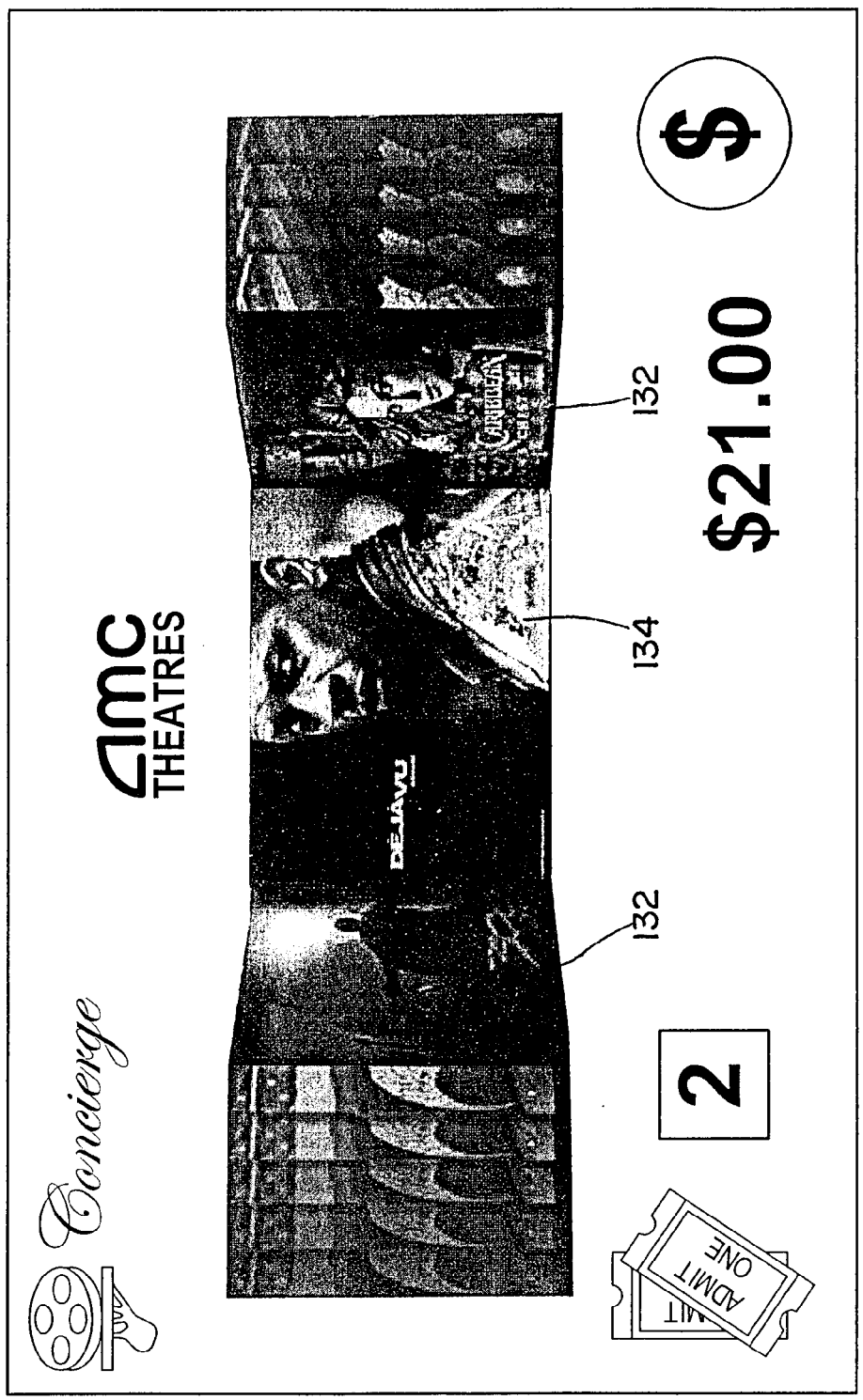
FIG. 23 is a simulated 3D view of a stack of panels displaying Concierge content.

FIG. 23 shows another 3D image 130 based upon the concierge function, comprising a stack of panels 132 displaying movie stills on exposed panel faces. The panels 132 on the left side are tilted to the left, to display images on their right-hand faces, while the panels on the right side are tilted to the right, to displace images on their left-hand faces. A central area between the two stacks of panels displays an additional image facing 134 the viewer. The exposed left panel, central area, and exposed right panel collectively form an interior display space similar to interior walls of a box, in contrast to the exterior surfaces of FIG. 22. A viewer can leaf through the stacked panels 132 to expose new surfaces; select a panel 132 to move it out of the stack toward the viewer (zoom function); and turn over the enlarged panel 134 thereby displaying additional information.

Navigation Interface Feature: Alternative Click Actions Prompted by Visual Cue

In a flexible navigation method according to the invention, the user is given a choice of two or more click actions of the handheld input apparatus with which to effect a given click event. For example, the user may have a choice of either a cursor-based click action or a movement-based click action to cause the same click event. This accommodates users who prefer to use pointing devices, and users who prefer to use motion-sensitive devices. The navigation interface includes a visual cue to both click actions.

This visual cue plays a dual role that is compatible with both click actions. For example, a navigation icon can be coextensive with hot spots in the central menus screen to actuate cursor-based click events, and can be associated with pointing device movements to prompt motion-based click events. Either type of click action—whichever is easier for the viewer—will be successful.

Figure 12A:
FIG. 12A shows a circular-arrow icon 150 for performing a turn function.
Figure 12B:
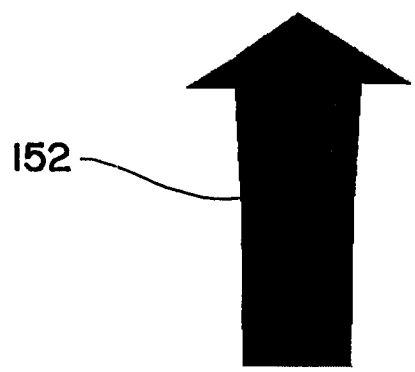
FIG. 12B shows a tapered arrow icon prompting a zoom function.
Figure 12C:
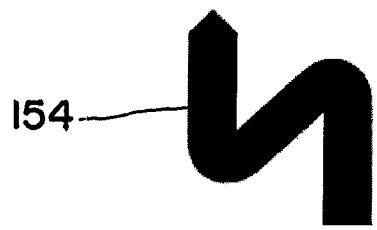
FIG. 12C shows a "winding road" arrow icon prompting a leaf function.

Examples of these navigation icons include are shown in FIGS. 12A-12C. FIG. 12A shows a circular-arrow icon 150 for turning images, pages or tiles (turn function). FIG. 12B shows a tapered arrow icon 152 prompting upward translational movement of the motion-sensitive device, and suggesting a scaling up effect (zoom function). FIG. 12C shows a "winding road" arrow icon 154 prompting forward-backward-forward translational movement of the motion-sensitive device, e.g. to initiate the leaf function.

FIG. 15 shows the circular arrow icon 150 displayed on a selected tile 112 in a 3D matrix view 110, in which a selected tile 112 is shown at larger scale than other tiles. Mouse-over at the circular arrow on the selected tile 112 will cause the tile to turn over (turn function). In addition, the tile will be turned over by one of the "turn" rotational movements of the motion-sensitive device such as rotate-twist (left-right-left) 5-10° (see Table 2 below).

A second example is shown in FIGS. 3A and 3B. The user can point at the winding road icon 30 at the tab 26 of the active layer, causing the navigation interface to flip slowly through the layers ("leaf" function). When a desired function is active, the user can select that layer. A forward-backward-forward horizontal motion of the motion-sensitive handheld device will cause this same click event of flipping through the extended zone layers (see Table 2). The winding road icon 30 or 154 suggests this forward-backward-forward translational movement of the motion-sensitive device.

These visual cues can suggest or prompt the click actions (e.g. the "winding road" icon), can suggest the click event, or can suggest both the click actions and the click event (e.g. the circular arrow icon and tapered arrow icon). Visual cues that suggest click actions are preferred.

Other visual objects besides icons can be used as visual cues, such as depth cues embodied in three-dimensional objects or images, as described above. Examples of such depth cues, relating to Level of Detail transitions, are described below at "Navigation Interface Feature: Scale up of 3D objects with appearance state change (Level of Detail)". Depth cues relating to three-axis images including linear perspective are described below at "Horizon Line User Interface Control".

An example of a depth cue suggesting a click action is a 3D image with linear perspective that prompts a viewer to use a Six Degrees of Freedom Motion-Sensitive Device to cause perceived motion into or out of the Z-Axis of the image (axis $z_2$ at FIG. 14, described at "Handheld Pointing Device and Six Degrees of Freedom Motion-Sensitive Device" below). An example of a depth cue suggesting a click event is an image providing an illusion of a z-axis pathway that suggests movement of a navigation object into and/or out of the television. Another example of a depth due suggesting a click event is an abrupt Level of Detail transition in object size and texture, which alerts a viewer to a control function that becomes available following the transition.

Navigation Interface Feature: Scale Up of 3D Objects with Appearance State Change (Level of Detail)

Level of detail involves decreasing the complexity of a 3D object representation as it moves away from the viewer, or conversely increasing the complexity of a 3D object representation as it moves toward the viewer. Level of detail transitions also can be associated with other metrics, such as object importance or position. Level of detail ("LOD") is typically associated with object geometry, but also may involve other characteristics affecting the complexity of graphical representations, such as shading.

One embodiment of the invention utilizes a three dimensional effect that combines scaling up of objects with an appearance state change comprising an abrupt, distinctive increase of level of detail. This appearance state change of level of detail is associated with a state change of control function. At the time of the LOD transition, the system may load a new set of logic functions to change click events associated with the 3D object.

In computer graphics, it is considered highly desirable to provide a smooth transition between LOD levels, in order to improve the realism of a graphic representation. Techniques such as alpha blending or morphing can be used to reduce abrupt visual transitions sometimes called visual "popping". However, this embodiment of the invention recognizes that an abrupt, distinctive transition in LOD can serve as a visual cue, alerting the viewer to a change in the navigation interface control functions or click events.

As an example of this embodiment, during zoom-in the appearance state of an icon can change from displaying a single indistinct object to displaying several distinct graphical features, and the control state can change to allow the users to select among choices corresponding to those graphical features.

Techniques for rendering a higher level of detail include for example texture mapping and bump mapping (e.g. to generate beveled edges of an object). By contrast, a lower level of detail object may be shaded one solid color. A well known technique for providing multiple levels of detail in a zooming user interface, sometimes called Discrete Levels of Detail (DLODs), employs a plurality of pre-computed images, each being a representation of the same visual content but at different resolutions. As zooming occurs, the system interpolates between the DLODs and displays a resulting image at a desired resolution.

The invention uses level of detail techniques adapted to distance viewing, i.e. the ten foot experience. In zooming in to provide larger images with a higher level of detail, the invention uses a DLOD for at a zoom-in end point that displays additional objects or features, or transformed object types, that convey information that is logically distinguishable from the starting point image. For example, a relatively unfocused, unitary image at the starting DLOD is transformed into multiple, visually distinctive objects at the end point DLOD thereby conveying additional information following the zoom operation. As another example, a graphical image e.g. logo at the starting DLOD is transformed into alphanumeric content at the end point DLOD following the zoom operation. Visual perception in 10-foot distance viewing permits the design of a sequence of images that bridge the starting and ending DLODs resulting in a distinctive image transformation without discomfiting the viewer.

Handheld Pointing Device and Six Degrees of Freedom Motion-Sensitive Device

Figure 13A:
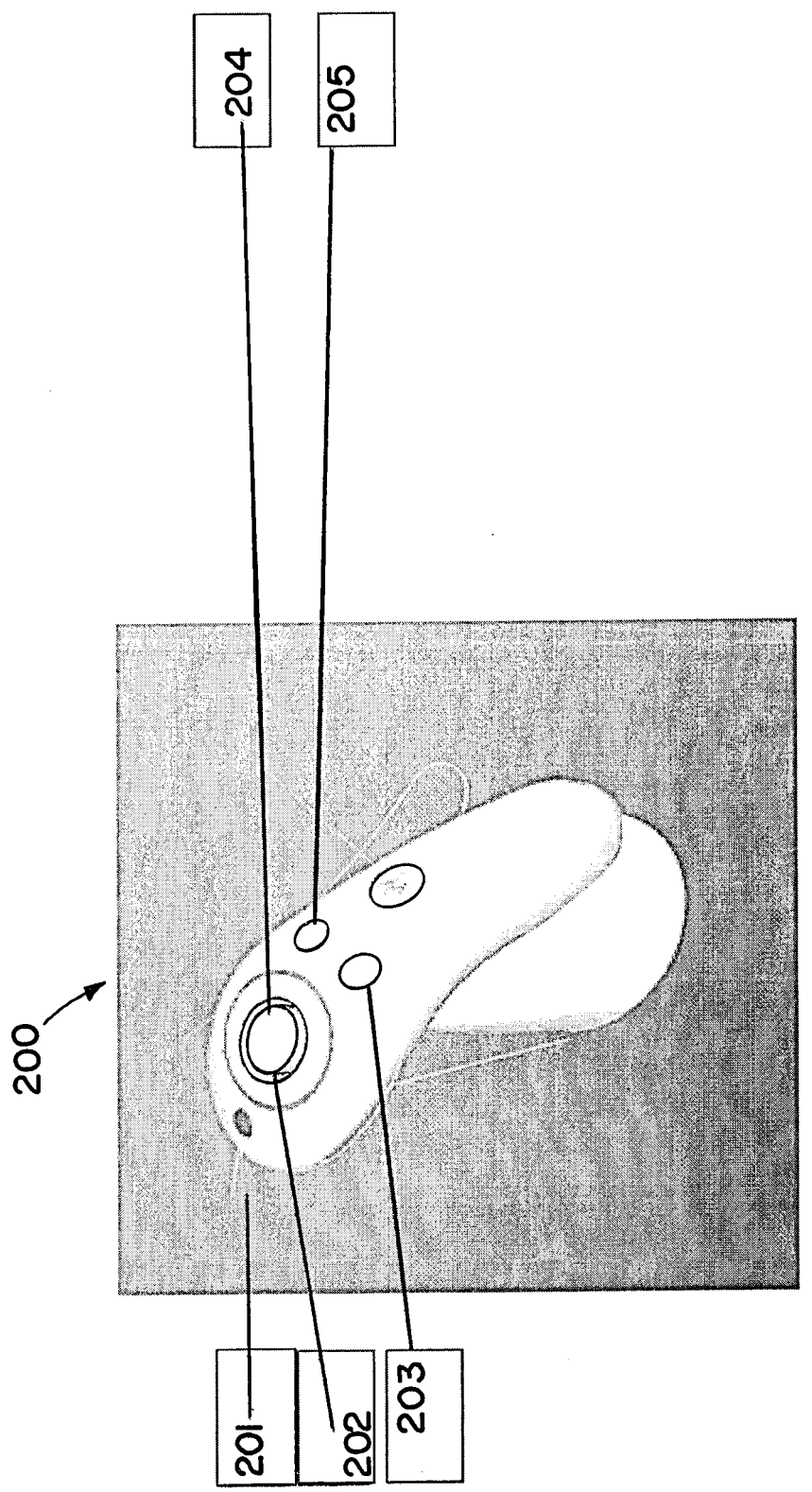
FIG. 13A is an upper perspective view of a handheld input apparatus.

The invention preferably uses a handheld input apparatus that combines the functions of pointing device and motion-sensitive device, the latter providing six degrees of freedom motion sensing. FIGS. 13A and 13B show perspective views of a handheld input apparatus 200 ("wand") for interactive television based upon motion sensing products supplied by Sengital Ltd., Hong Kong. In the upper perspective view of FIG. 13A, item 201 is a power on-off switch for the iTV. Item 202 is an analog stick button, which may serve as an enter button to confirm functions. Item 203 is a left button, which opens an active area of the graphical user interface at which the mouse cursor is located, e.g. a hot zone, or a hot spot within the central menu area. Item 204 is an analog stick, a type of joystick that consists of a protrusion from the pointing device's controller providing an input based on the position of this protrusion. The analog stick 204 may be manipulated by a user in a manner similar to how a joystick is tilted, for example to move a cursor or other element. Item 205 is a right button, which moves back to the prior layer of the navigation GUI (exit). In the lower perspective view of FIG. 13B, item 206 is a tricker button, which turns on and off the motion sensing feature. As discussed below, these button and analog stick functions are programmable.

The wand styling of the preferred handheld input apparatus 200 of FIGS. 13A and 13B evokes a TV (or gaming) remote rather than a PC-tethered mouse. However, the wand's functionality goes far beyond traditional television remotes to provide mouse-like maneuverability. The wand 200 allows users to interact with the screen by pointing and moving in air—no table is required.

The wand's controller (not shown) detects X, Y and Z translation motion of the pointing device, and detects pitch, yaw and roll rotational motion (rotation in three dimensions about the wand's center of mass). It will be appreciated that detection of translation and rotation of devices is known, for example as used in NINTENDO WII game systems. This motion-sensor can be combined with an analog stick button 202 in the pointing device 200, in which the device 200 detects depression of the stick button 202, and detects user movement of the stick 204 (e.g. move left, move right and hold).

Figure 14:
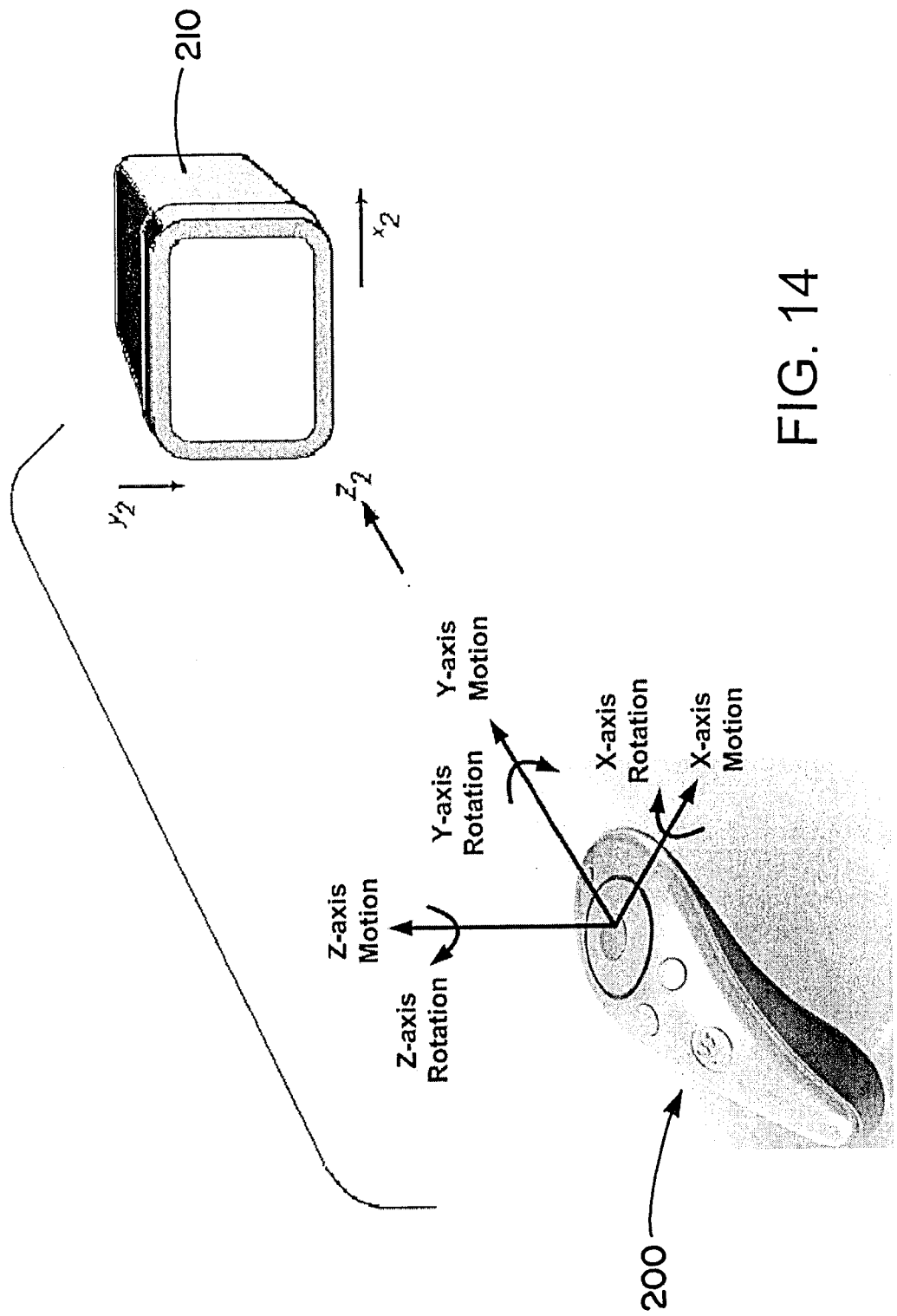
FIG. 14 is a schematic diagram of an alternative handheld input apparatus, showing the six degrees of freedom of the input apparatus in relation to the three dimensions of the iTV's visual user interface.

FIG. 14 shows the six degrees of freedom of the handheld input apparatus or wand 200 similar to the wand 200 of FIGS. 13A and 13B, defined relative to an iTV or other display device 210. These six degrees of freedom include x-axis, y-axis and Z-axis translational motions, and pitch, yaw and roll rotations around these axes. The x, y, and z axes of the handheld input device 200 are vectors following the right hand rule, wherein the y axis is the forward-pointing vector of the input apparatus and the x-y plane is approximately horizontal. FIG. 14 also shows the axes of the iTV's three-dimensional display user interface (UI). $X_2$ and $y_2$ respectively are the horizontal and vertical axes of the display used in describing two-dimensional UI locations and motions, while $z_2$ is the axis extending into the display screen used (in addition to $x_2$ and $y_2$) in describing three-dimensional UI effects. In programming the handheld input apparatus 200, translational and rotational movements of the handheld input apparatus 200 in the x, y, and z axes can be mapped to resulting display user interface movements in the $x_2$, $y_2$ and $z_2$ axes, as exemplified by various mappings shown in Table 2 below.

Tables 1 and 2 give example mappings of click actions of the handheld input device to on-screen actions of the navigation GUI. Considerations in planning these mappings include:
- The same pointing action (Table 1), or movement (Table 2), of the handheld input device may have different results (click events) depending on context
- Contexts include the level of the navigation interface (①, ②, or ③), the nature of the object that is active on screen, and whether a special navigation mode (such as 3D effects) is active
- Where ever possible, the results of a click action should bear a natural relationship to the action.

Table 1 shows an example of mapping movement of the hand held input apparatus (analog stick—item 4, FIG. 11) to navigation interface actions. These analog stick movements could be used for example to browse search results in the stacked view of FIG. 9, matrix view of FIG. 10, and list view of FIG. 11.

TABLE 1

ANALOG STICK MOVEMENTS/EFFECTS

| CLICK ACTION | CLICK EVENT |
|---|---|
| Analog stick move left (West) | Move tiles or windows into the screen from the left side in Matrix View |
| Analog stick move left (West) and hold | Move tiles or windows continuously into the screen from the left side in Matrix View |
| Analog stick move right (East) | Move tiles or windows into the screen from the right side in Matrix View |
| Analog stick move right (East) and hold | Move tiles or windows continuously into the screen from the right side in Matrix View |
| Analog stick move front (South) | Navigate to next object above in Matrix View Page forward one object in List View or Stacked View ("Leaf") |
| Analog stick move front (South) and hold | Navigate continuously forward within objects in Matrix View Page continuously forward through stack in List View or Stacked View ("Leaf") |
| Analog stick move back (North) | Navigate to next object below in Matrix View Page back one object in List View tacked View ("Leaf") |
| Analog stick move back (North) and hold | Navigate continuously forward within objects in Matrix View Page continuously back through stack in List View or Stacked View ("Leaf") |

Table 2 shows an example of mapping translational and rotational movements of the hand held input apparatus 200 (FIGS. 13A and 13B) to navigation interface actions. The listed results of these various movements are exemplary, and not intended as complete. As examples of different results depending on context, it will be seen that the same movement may cause a change in slider bar setting, or a movement of tiles or other objects in the central menu screen, depending on what function is active. Preferably the mode of operation of the hand held input apparatus changes automatically based upon the state of the navigation user interface. Alternatively the mode of operation may change based upon a user selection of input mode. An example of the former is a difference in object motion depending on the way objects are arrayed in the central menu screen. An example of the latter is user activation and inactivation of a 3D Input mode including the zoom function (see Rotate (right-left-right) 45°).

TABLE 2

MOTION-SENSING DEVICE MOVEMENTS/EFFECTS

| CLICK ACTION | CLICK EVENT |
|---|---|
| Move horizontally (left-right-left) | Decrease setting by one step on a selected slider bar Move tiles or windows into the screen from the left side |

TABLE 2-continued

MOTION-SENSING DEVICE MOVEMENTS/EFFECTS

| CLICK ACTION | CLICK EVENT |
|---|---|
| Move horizontally (right-left-right) | Increase setting by one step on the selected slider bar Move tiles or windows into the screen from the right |
| Move horizontally to the left and stay | Decrease setting on slider bar continuously Move tiles or windows continuously into the screen from the left side |
| Move horizontally to the right and stay | Increase setting on slider bar continuously Move tiles or windows continuously into screen from the right side |
| Move vertically (up-down-up) | Increase setting by one step on the slider bar (e.g. Channel or Volume) Channel—after video hot zone is activated |
| Move vertically down-up-down) | Decrease setting by one step on the slider bar (e.g. Channel or Volume) Channel—after video hot zone is activated |
| Move vertically up and stay | Increase settings continuously on the slider bar until stopped (channel numbers when video is activated) (volume settings when audio is activated) |
| Move vertically down and stay | Decrease settings continuously on the slider bar until stopped (channel numbers when video is activated) (volume settings when audio is activated) |
| Move horizontally (forward-backward-forward) | Zoom in or scale up by one step (when in "3D Input" mode) Navigate forward continuously in matrix view Page forward continuously in Stacked View or Extended Zone ("Leaf") |
| Move horizontally (backward-forward) | Zoom out or scale down by one step (when in "3D Input" mode) Navigate backward by one object in matrix view Page backward one object in Stacked View or Extended Zone ("Leaf") |
| Move horizontally to the left and stay | Transfer objects or files from preliminarily selected hot zone to central menu screen |
| Move horizontally to the right and stay | Transfer objects or files from preliminarily selected hot zone to central menu screen |
| Rotate-twist (left-right-left) 5-10° | Decrease slider bar setting by single step |
| Rotate-twist (left-right-left) 45° | Decrease slider bar setting by multiple steps |
| Rotate (right-left-right) 5-10° | Turn over images or pages or tiles ("Turn") |
| Rotate (right-left-right) 45° | Toggle 3D Input Mode (on/off) |
| Upward Motion | Scale up selected object to double magnification ("Zoom") |
| Hammer Function | Play Object |

The click action-click event mappings shown in Tables 1 and 2 are merely illustrative of the principles of the present invention. The effects of these analog stick movements and six degree-of-freedom movements, as well as the button pushes, are freely programmable in the device 200 of FIGS. 13A and 13B.

Interactive Television User Interface with Hot Zones and Slider Bars

Figure 19:
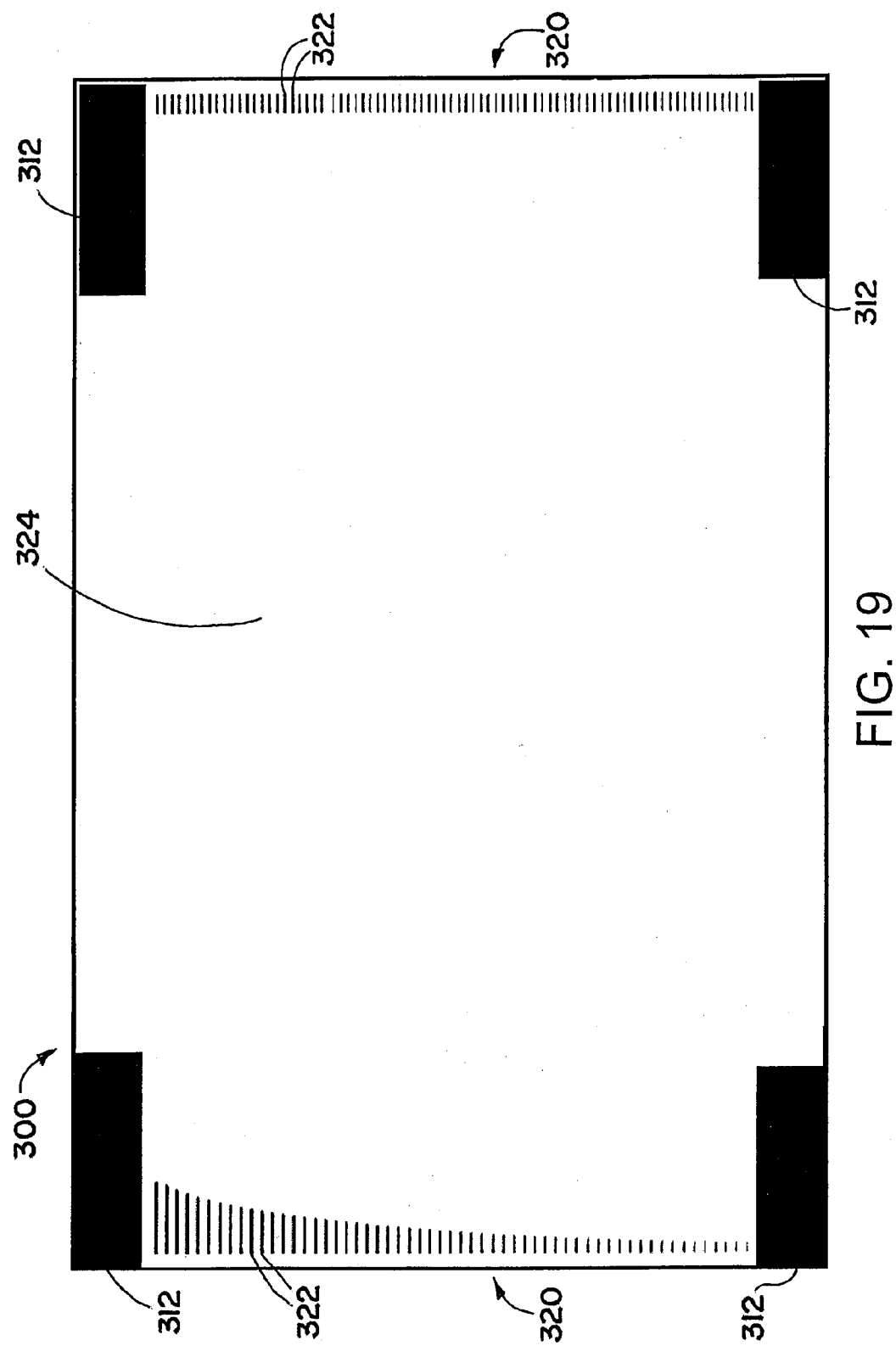
FIG. 19 is an alternative basic layout of an iTV navigation interface.

FIG. 19 shows an alternative basic layout 300 for a user interface of in interactive television. This layout includes hot zones 312 at the four corners of the display screen, and slider bars 320 at the screen edges, all being control elements for user inputs. The hot zones 312 are typically used for multiple-choice inputs, while the slider bars 320 are used for quantitative inputs within a range of digital values.

The corner hot zones 312 may be permanently active, i.e. responsive at all times to a pointing device. The hot zones 312 may operate in conjunction with extended zones, as described above with regard to FIGS. 3A and 3B.

The slider bars 320 comprise a series of input elements corresponding to active pixel zones, with associated values or levels of the controlled iTV function. These values or levels may vary linearly with the position of each input element 322 on the slider bars 320, or that may vary in some other way such as logarithmic function of element position. In the slider bars 320 of FIGS. 19-21 the input elements 322 appear as discrete physical components on the slider bar 320, but this discrete appearance is optional.

Figure 21:
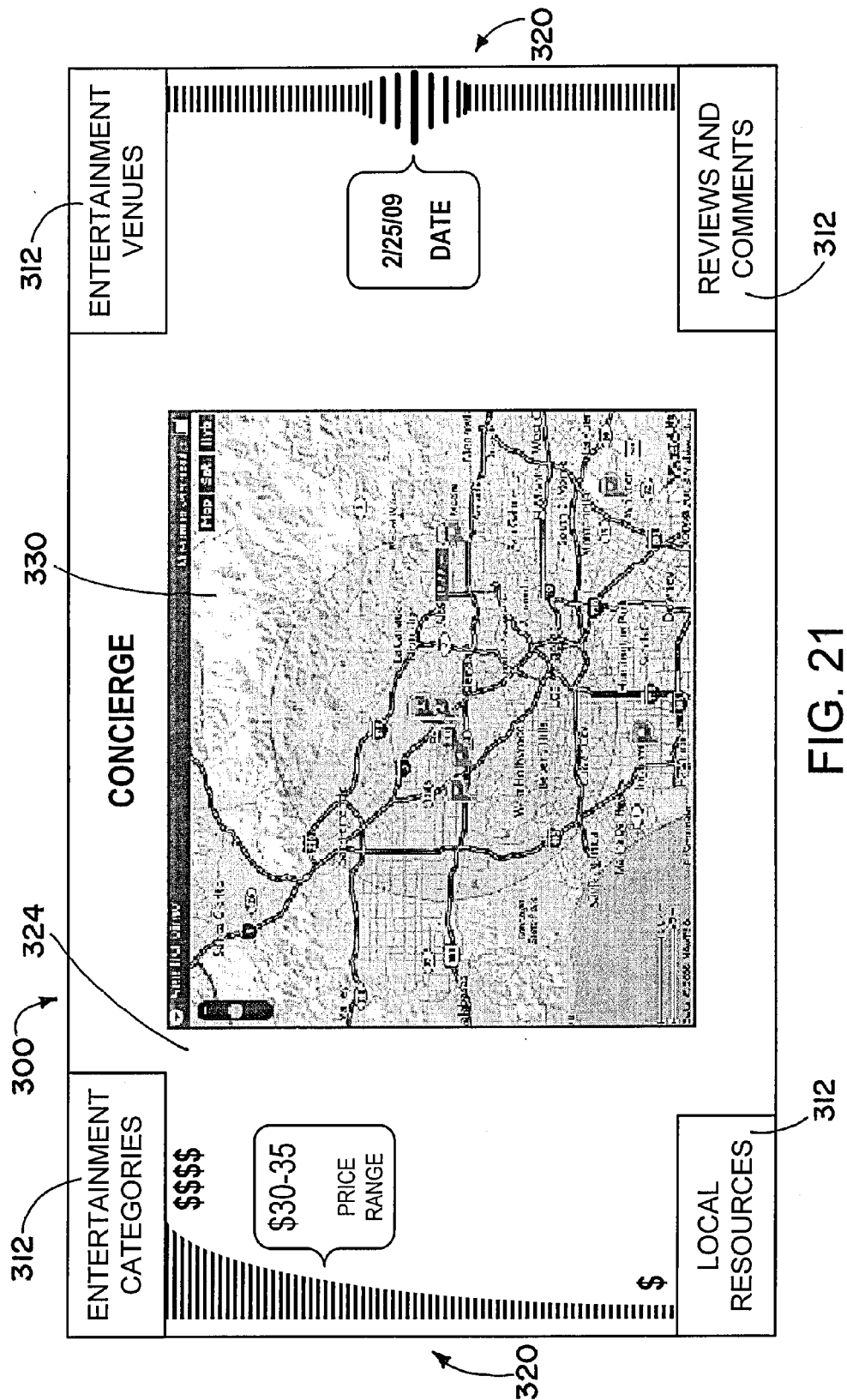
FIG. 21 shows the iTV layout of FIG. 19 adapted to a Concierge context.

Optionally, the navigation interface layout 300 may include a central display area that may display additional control elements and other visual content, as shown in FIG. 21.

The hot zones 312 have associated data sets (i.e. controlled iTV functions) that change depending on context. Likewise the slider bars 320 control associated functions with ranges of quantitative values, and these controlled iTV functions change depending on context. In typical operation of this iTV user interface 300, the functions that are assigned to the four hot zones 312 may change simultaneously with a change of context. Similarly, the functions that are assigned to the two slider bars 320 preferably change simultaneously with a change of context. The function assignments for the hot zones 312 may or may not change simultaneously with the function assignments for the slider bars 320. Context changes include for example: selection of a multiple choice at one of the hot zones 312 (e.g. selection of IP TV at the main hot zones configuration changes hot zones to the IP TV configuration); a change of content displayed at the central display area 324; selection of a control element in the central display area 324; interdependent changes of hot zone and slider bar assignments; and a prescribed click action of the handheld input device, such as an "exit" input to move back to a prior navigation configuration.

The hot zones 312 or slider bars 320 may have appearance attributes such as color, texture and shape that assist the user in identifying the functions and data assignments of these GUI elements. These appearance attributes also can alert the viewer to a change of data assignments for the hot zones 312 or slider bars 320. One example of appearance features is color coding of hot zones shown in FIGS. 19-21—for example grey for general menus, blue for audio-video, and green for internet services. Another example is the difference in shapes of the slider bars 320 of FIGS. 19-21. The tapered left-hand slider bar 320 in FIGS. 19-21 connotes a gradation from lowest to highest level, whereas the constant-width right hand slider bar 320 (which is bulged at the selected level in FIGS. 20 and 21) does not have this same connotation. A third example is a highlighted appearance of the right hand slider bar of FIG. 21, indicating that slider bar 320 is active and will be affected by a click action of the handheld input apparatus 200 (FIGS. 13A and 13B).

Figure 20:
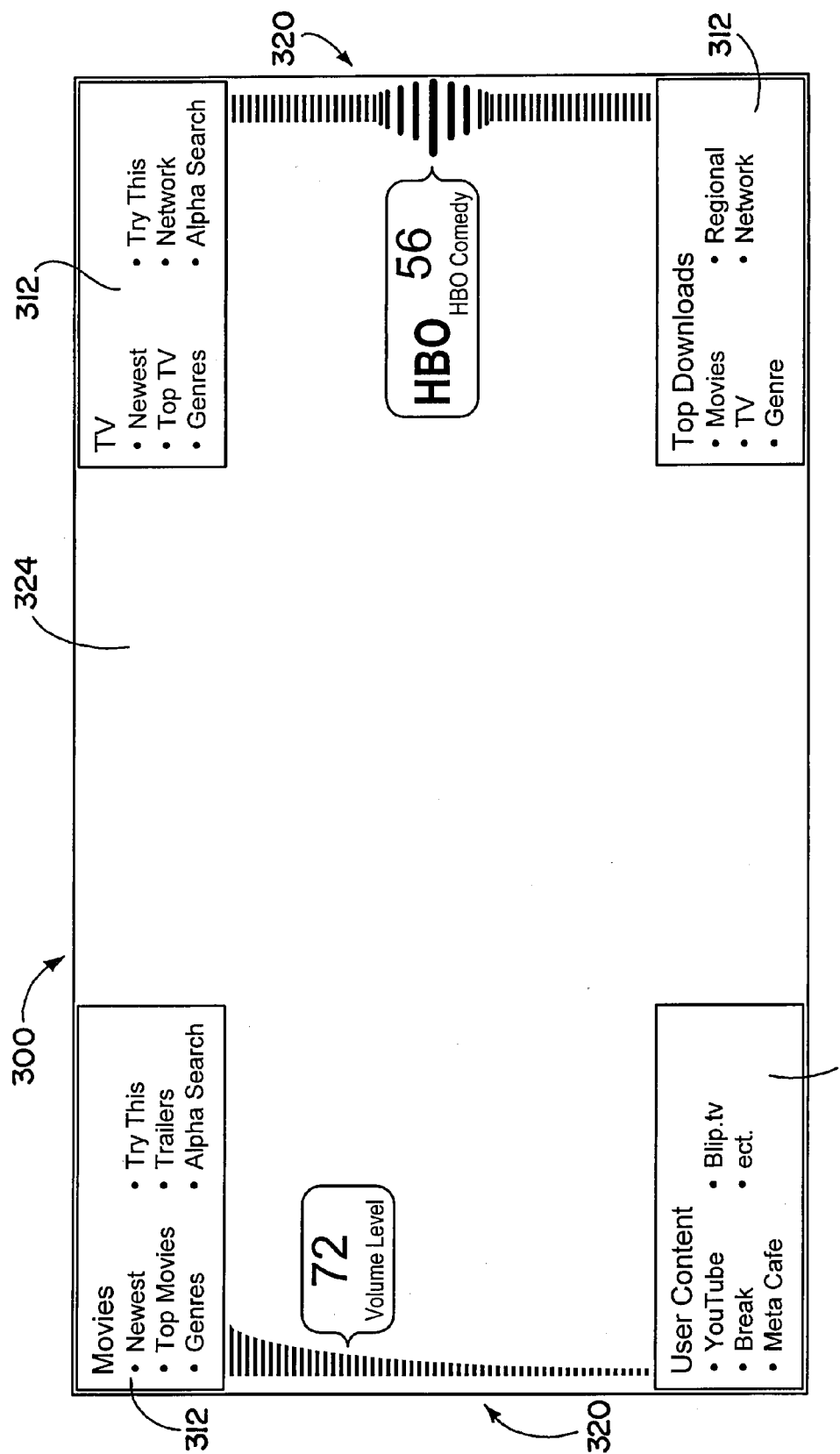
FIG. 20 shows the iTV layout of FIG. 19 adapted to an IP TV context.

FIG. 20 shows the hot zones 312 and the slider bars 320 configured for IP TV. In this configuration, the left-hand slider bar 320 controls audio volume level, and the right-hand slider bar 320 controls channel selection.

FIG. 21 shows the hot zones 312 and the slider bars 320 configured for a concierge function, which assists a user in identifying suitable entertainment. In this configuration, the left-hand slider bar 320 selects the price range of the entertainment item, and the right hand slider bar 320 identifies the date of the entertainment item (e.g. to investigate a future entertainment event). In the concierge screen of FIG. 21, the user has launched a local map 330 in the central display area via the Entertainment Venues hot zone. This map shows 330 the location of entertainment items returned by a search launched from the Entertainment Categories hot zone 312.

Horizon Line User Interface Control

Figure 24:
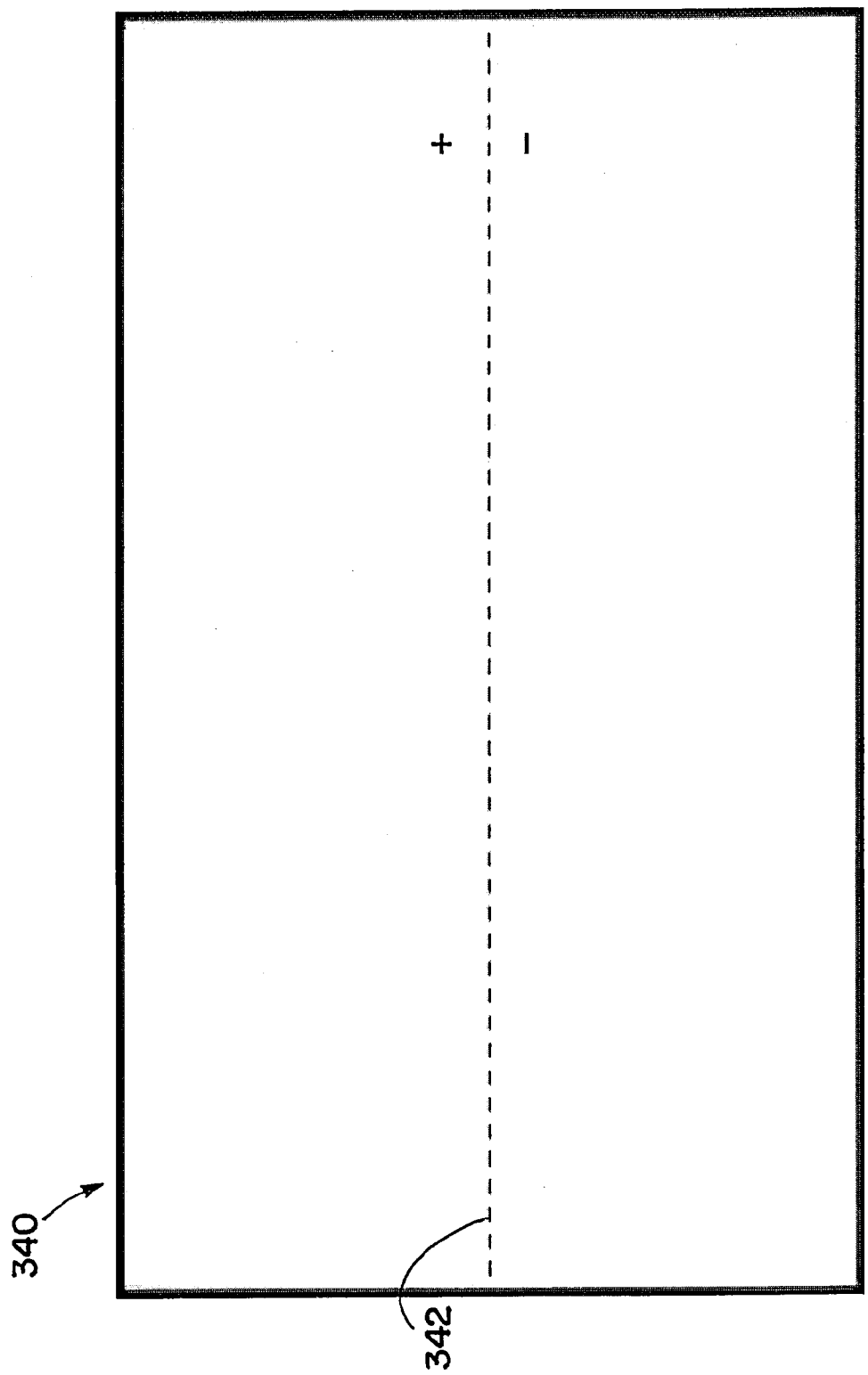
FIG. 24 illustrates an exemplary iTV graphical user interface with horizon line control layout.
Figure 25:
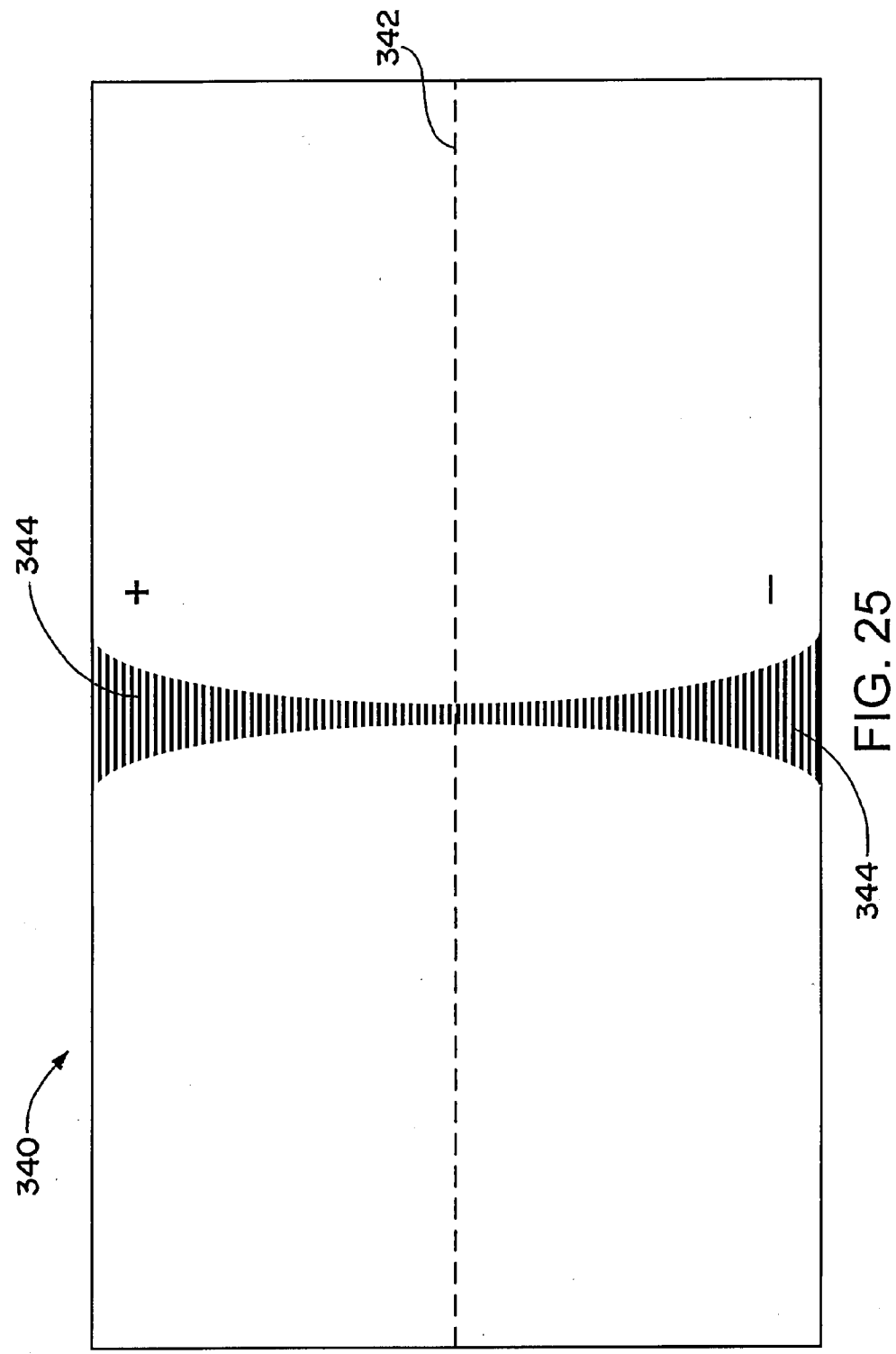
FIG. 25 illustrates an alternative iTV graphical user interface with horizon line control layout.
Figure 26:
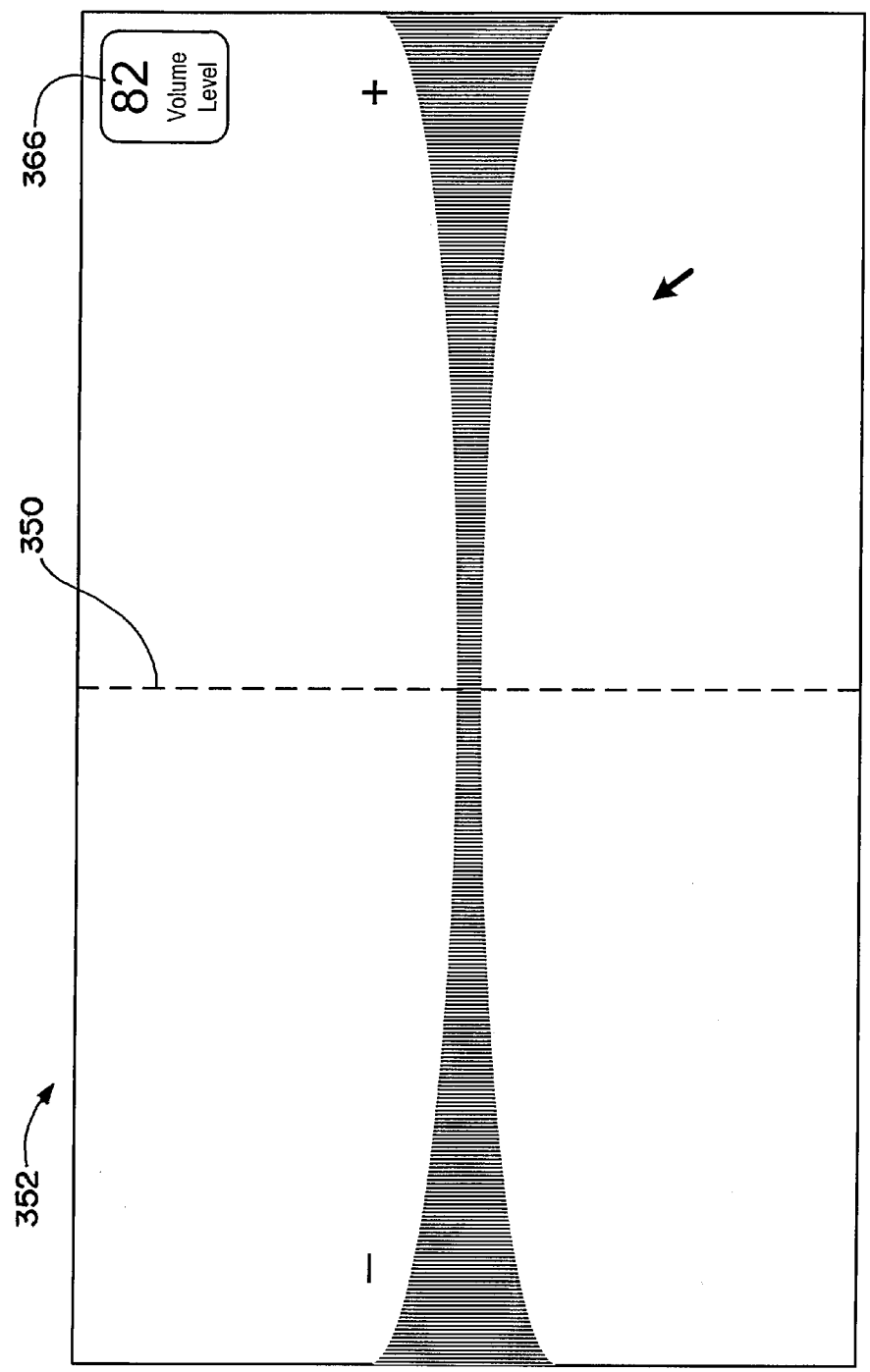
FIG. 26 illustrates a further iTV graphical user interface with vertical horizon line control layout.
Figure 27:
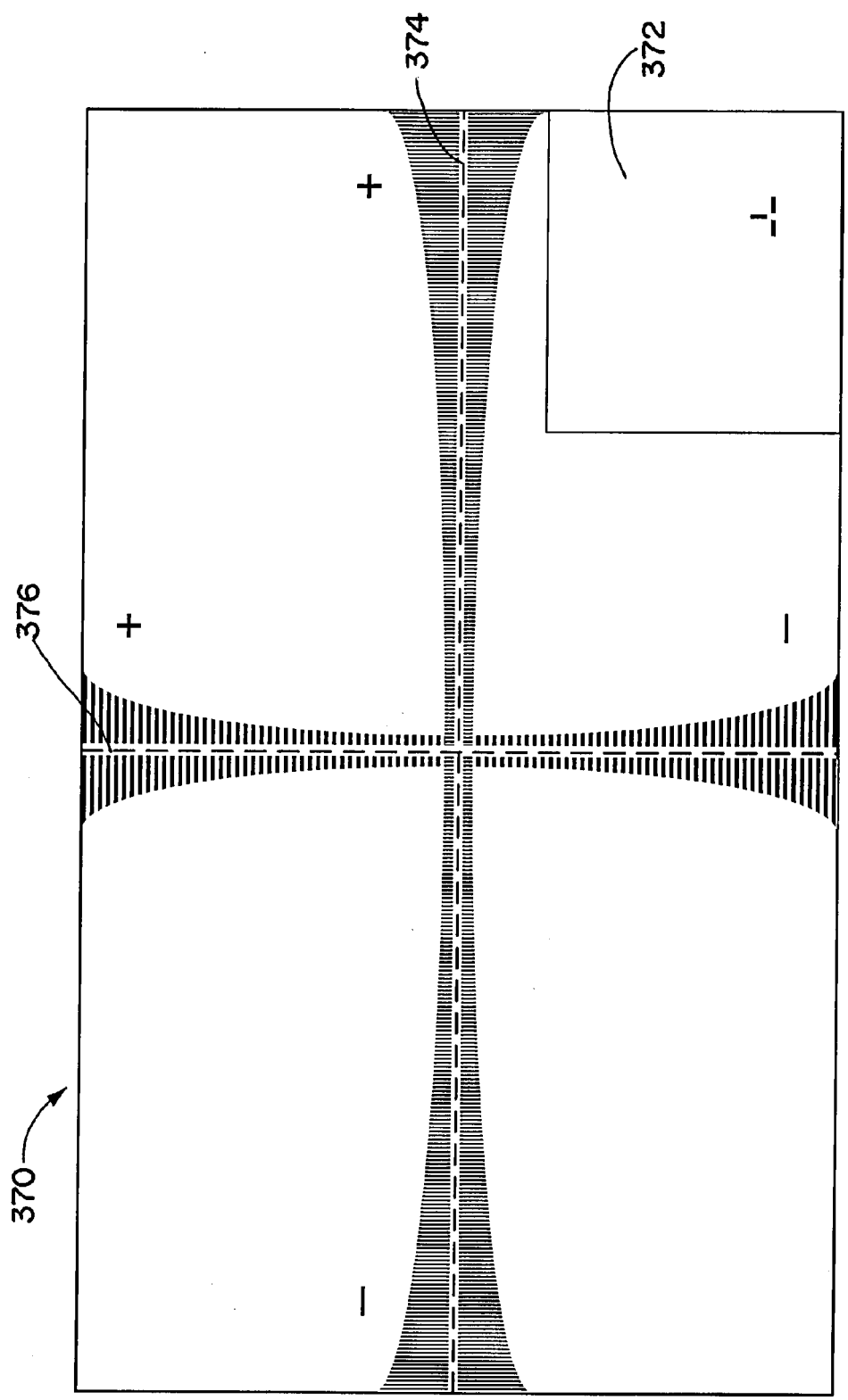
FIG. 27 illustrates a further iTV graphical user interface with two-axis horizon line control layout.

A further aspect of the interactive television navigation interface is a user interface control for increase and decrease of a function. In a basic embodiment shown in FIG. 24, the increase-decrease control comprises a display screen 340 with a horizon line 342 extending along a horizontal axis. Movement of the cursor to on one side of the horizon line 342 (in this case preferably, above the line) causes an increase of a controlled function, and cursor location on the other side of the horizon line (i.e. below the line) causes a decrease of the same function. In the versions of FIGS. 25-27, the increase or decrease accelerates at greater distances from the horizon line (or lines). The rate of increase or decrease may change linearly as a function of distance above or below the horizon line. Preferably, however, the rate of increase or decrease changes as a logarithmic function of distance from the horizon line.

In FIG. 25, the horizon line 342 extends horizontally across the iTV screen 340, and the controlled function increases or decreases depending on cursor location above or below the horizon line 342. This is represented by different lengths of displayed elements 344 above and below the horizon line 342. It will be appreciated that display of the elements 344 is not required, although display of the elements 344 may serve as a visual cue for the user regarding the increase/decrease depending on cursor location relative to the horizon line 342. In other words, the elements 344 may be used as a rate indicator.

Figure 28:
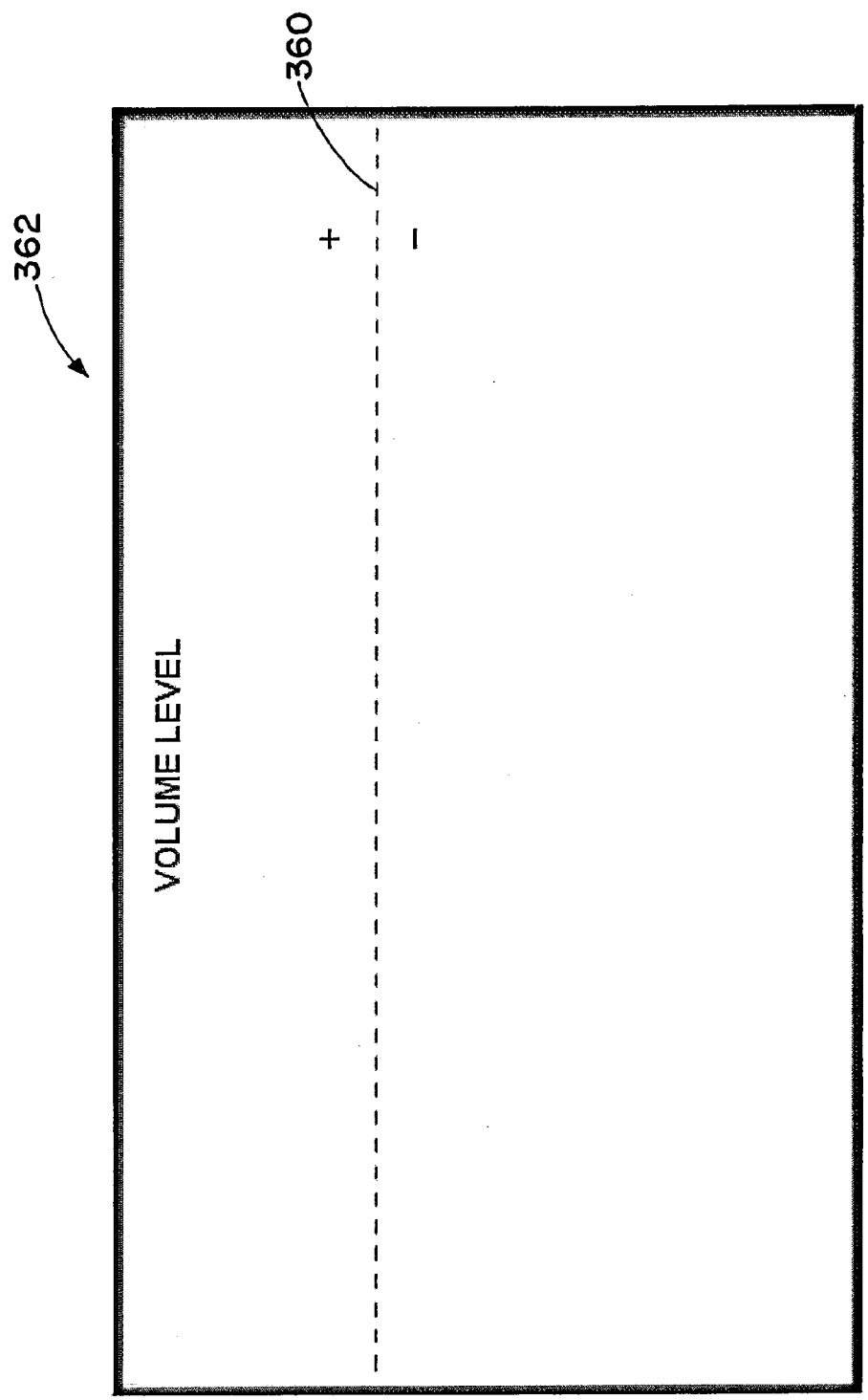
FIG. 28 illustrates an iTV graphical user interface with asymmetric horizon line control layout.

Alternatively as shown in FIG. 26, the horizon line 350 extends vertically across the iTV screen 352, and the increase or decrease depends on cursor location on the left or right side of the horizon line. Preferably the horizon line 350 is centered on the screen 352 (i.e. substantially equal space on both sides of the horizon line). Alternatively the horizon line 350 may be asymmetrically located on the screen 352, which can be useful if the horizon line control is opened when the value of the controlled function is near the low end or high end of its normal range. Thus in FIG. 28, the horizon line control has been opened when the controlled function (volume level) is high, and the horizon line 360 appears in the upper area of the screen 362. The horizon line may be visible 360 (as shown in the Figures) or invisible. The horizon line may become visible upon some event such as a click event at a hot zone or central menu screen.

In cases in which the rate of increase or decrease accelerates at greater distances from the horizon line, the user interface may include a rate indicator. The rate indictor is a visual indictor of the rate of increase or decrease of the controlled function. FIGS. 25-27 show various layouts with rate indicators extending transversely to the horizon line(s). These rate indicators suggest the higher rates of increase or decrease at greater distances from the line. Unlike the slider bar controls of FIGS. 19-21 which may be similar in appearance, these rate indicators are not control elements but rather the entire screen (except perhaps for corner hot zones, if present) is active. Thus a cursor located as seen in FIG. 26 will have the same effect as any cursor placement along the vertical axis including that location.

The horizon line user interface may also show the instantaneous value or state of the controlled function, and thus show the increase or decrease of this value or state over time. One example is seen in FIG. 26, which includes a volume level indictor 366 at the upper right corner of the screen. Where the controlled function is a video setting, the user interface may depict the setting through a graphical or video image. For example in the two-axis horizon line control 370 of FIG. 27 (as discussed below) the two controlled functions are the video settings hue and saturation, and the color gamut 372 at the lower right of the screen shows changes of hue and saturation settings through the changing location of a cursor.

The horizon line control can be interposed over another image as a semi-transparent overlay. Alternatively an opaque horizon line control can be shown side-by-side with another image via an embedded image, e.g. picture-in-picture. Thus a user might view the effect of change of video setting caused by cursor location in the horizon line user interface ("UI"), by viewing changes in a background image or video.

In a more advanced version shown in FIG. 27, two horizon line controls are used in combination, providing simultaneous control of two different functions. One function changes depending upon vertical distance from the horizontal horizon line 374, while another function changes depending upon horizontal distance from the vertical horizon line 376. This facilitates multi-variable control, as discussed below.

The horizon line UI control can be used to control the increase or decrease of various iTV functions such as channel, volume, and video settings such as contrast, brightness, backlight, hue, and saturation. In a two horizon-line UI, the control layout can help the user visualize the relationship between changes of the two controlled functions. Thus for example in FIG. 27, the horizontal horizon line UI may control hue and the vertical horizon line UI may control saturation. The user can move the cursor around the screen depending on how the user wishes to adjust these settings, and can view current settings in the color gamut at lower right. The horizon line control also is useful in adjusting interdependent functions, i.e. functions for which an increased level of one generally calls for a decreased (or increased) level of the other. For example in setting brightness and contrast, if a user increases one function usually she should decrease the other, thus suggesting a cursor placement in the upper right quadrant or lower left quadrant.

A further variation of the horizon line control interface includes three axes of increase-decrease control (3D horizon line interface). Whereas in a one or two dimensional horizon line interface the increase-decrease control is typically visualized with respect to a horizontal or vertical line (or both) within the display plane, in a 3D interface the third dimension of control requires another technique (i.e. depth cue) to visualize the depth dimension of increase-decrease control. One such technique, shown in FIGS. 29 and 30, uses virtual X-Y planes parallel with the display plane. Each virtual plane can represent increase-decrease levels of a Z-variable function.

Figure 29:
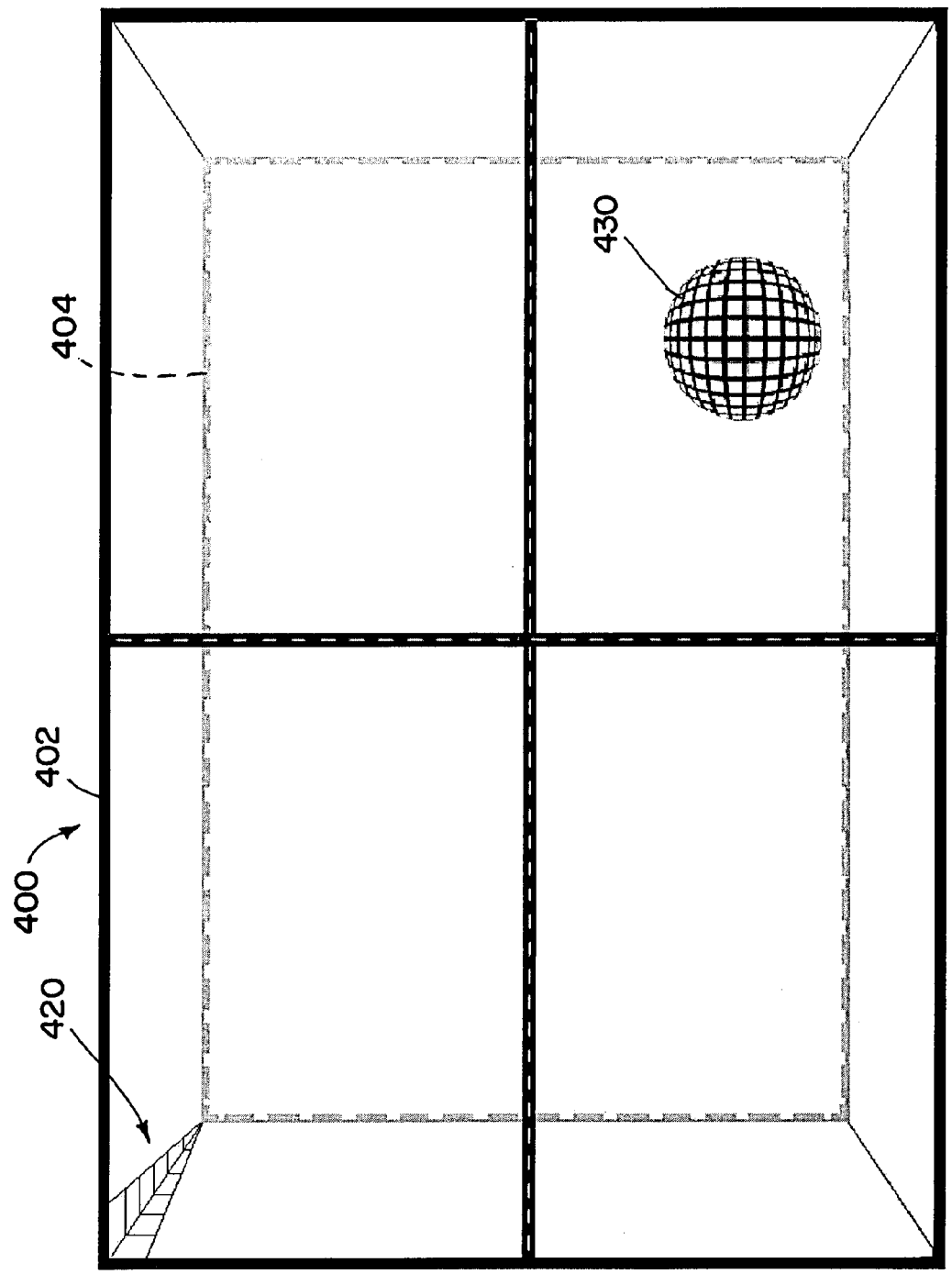
FIG. 29 illustrates an iTV graphical user interface that incorporates depth cues, with an active plane closer to the viewer than a reference plane.
Figure 30:
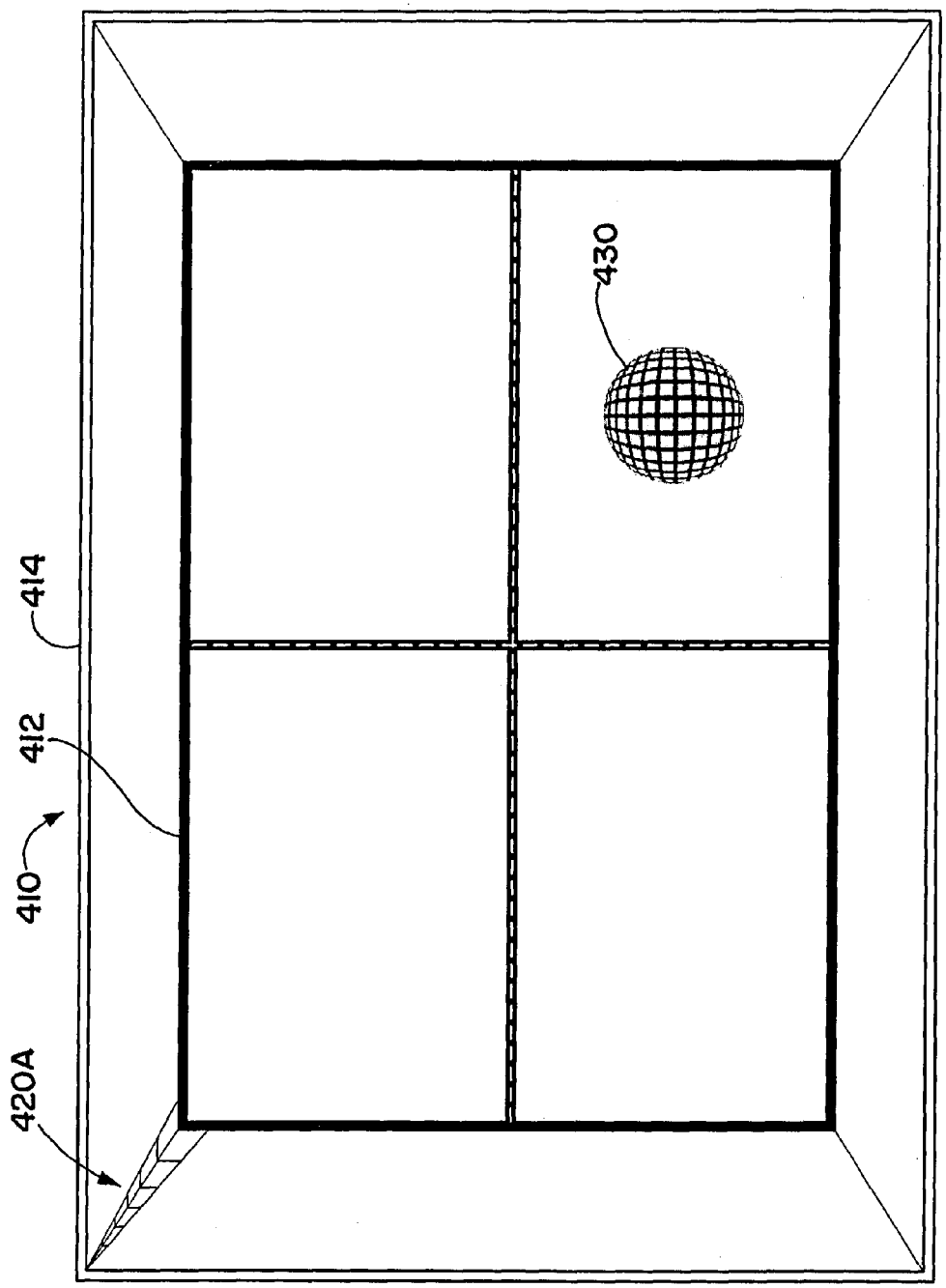
FIG. 30 illustrates an iTV graphical user interface that incorporates depth cues, with the active plane farther from the viewer than the reference plane.

FIGS. 29 and 30 illustrate 3D horizon line interface display screens incorporating linear perspective to depict the depth dimension of horizon line controls. Each view shows two virtual planes including an active X-Y plane, and a threshold plane. In these linear perspective views, the smaller plane is farther away from the viewer, and converging lines at the corners of the planes are perpendicular to the planes (i.e. parallel to the Z-axis). The threshold plane intersects the Z-axis at a point at which the Z-axis variable function remains constant. The active plane includes X and Y horizon lines and a rectangular border, and represents a planar area that is active for the purposes of X-Y horizon line control. Cursor (or other control object) movement within the active planar area effects increase-decrease control of X and Y control functions.

In FIG. 29, the display screen 400 shows the active X-Y plane 402 closer to the viewer than the threshold plane 404. Since the active plane 402 occludes the threshold plane 404 the latter plane is shown in phantom. In FIG. 30, the display screen 410 shows the active X-Y plane 410 farther away from the viewer than the threshold plane 412. Z-axis locations of the active plane closer than the threshold plane, such as seen in FIG. 29, correspond to increase (or conversely, decrease) of the Z-variable function. Z-axis locations of the active plane farther than the threshold plane, such as that of FIG. 30, correspond to decrease (or conversely, increase) of the Z-variable function. As in the one-dimensional and two-dimensional horizon line interfaces, Z-axis locations at higher distances from the threshold plane can cause higher rates of change of the Z-axis variable function. In FIGS. 29-30, there are rate indicators (420, 420A) for the Z-axis function at the upper left Z-axis linear perspective line.

In the 3D horizon line control, various types of graphical objects can serve as user-movable objects for the third (Z-axis) dimension of increase-decrease control. An active plane such as shown in FIGS. 29 and 30 can itself serve as a user-movable object. In response to a click action, linear perspective views can create an illusion of the active plane moving toward, away from, or through the threshold plane. Other graphical objects within an active plane also can serve as user-movable objects. For example, the zoom function can be applied to a 3D graphical object 430 within the active plane to cause to object to scale up and appear to move closer to the viewer along with the active plane (size depth cue). An example of this type of user-movable object is the sphere in the lower right quadrant of the active planes in FIGS. 29 and 30. Besides visual perspective and size, other types of depth cues can be used as visual cues to facilitate 3D horizon line control, e.g. the color or texture of the active X-Y plane can change when the plane moves from a location in front of the threshold plane, to a location behind the threshold plane.

In a 3D horizon line interface the iTV screen normally displays views of X-Y axes planes, with the Z-axis projecting perpendicular to the planes. However, the 3D interface can rotate the perspective of the 2D screen display, e.g. to show Y-Z axes planes. This may be desirable for example if the user wishes to control the Z-axis function via in-plane horizon line control, or to visualize interactive rate changes of the Y-variable and Z-variable functions.

The 3D horizon line user interface is compatible with both a pointing device, and a motion sensitive device such as the handheld apparatus 200 of FIGS. 13A-14. Cursor movements within the plane control the increase or decrease of the X-variable and Y-variable functions. The handheld input device 200 can cause the GUI to display a virtual plane at a different level along the Z-axis, affecting the z-variable function. The position of the cursor relative to the (0, 0, 0) coordinate, and a change of the perspective in 3D space that is simulated in the 2D screen display, can be derived from pitch/roll/yaw rotation and translation click actions of the motion sensitive device. Programming of a motion sensitive device can adapt engineering simulator and gaming techniques to navigation of a three dimension horizon line display. Movement of the handheld input device can create a visual effect of "flying" through control space. The horizon line user interface is evocative of the ADI (attitude deviation indicator) flight instrument, sometimes called the artificial horizon.

Web Site as Central Menu Screen

In the three-click navigation method of the invention, the second click navigates from the central menu screen to the content page. In one embodiment, the central menu screen (level two) is a web page, which may be designed for distance viewing of interactive television ("ten foot experience"). The web page may be originally designed for the ten foot experience, or may be a reformatted version of a web page that was originally designed for close up viewing. Markup language programming techniques and semi-automated procedures for reformatting web pages, such as hypertext markup language (HTML) transcoders, are well known in the art.

The invention provides a method for redesigning a web site originally designed for conventional PC viewing. Basic steps for adapting a traditional web page to serve as a content page in the three-click navigation method include:

Identify and extract the essential features of the web page;
Disaggregate these features into data objects, preferably using metadata;
Reformat the data objects (such as tiles, lists, etc) as graphical objects having a form and layout suitable for distance viewing, based upon the design techniques of the invention; and
Revise and reposition text and graphics within the data objects suitably for distance viewing.

The reformatting of data objects utilizes three dimensional data objects and/or animated data objects. Display formats widely used in designing web sites for the one-foot experience, such as a large number of tightly packed graphic tiles with "busy" text and images, must be redesigned for the ten foot experience. Generally the web site is redesigned to display fewer graphical objects, and three dimensional data objects and/or animated data objects are used to provide additional surfaces and views to display text and graphical content in a format that is suitable for viewing from a distance.

Preferably also the revision and repositioning of text and graphics includes repositioning text and/or detailed graphics in a three dimensional and/or animated data object for optional display or display in magnified form. Generally paragraphs of text should be broken up into smaller passages, and font sizes less than 16 points should be avoided.

These design rules provide a more uniform look and feel for the navigation interface, whether the central menu screen is based upon an original design, or a web site redesign. Examples of adaptations of traditional PC web pages based upon these design techniques include separating crowded text and graphics of tiles in the PC web page into easily recognizable graphics on the tiles' front, with more involved text accessible via turn and zoom of the tiles; reconfiguring long, involved lists in the web page into entries on a wheel that can rotate to prominently display given list entries; and changing a scrolling web page to stacked pages with navigation aids to leaf through pages or jump to a desired page.

Figure 17:
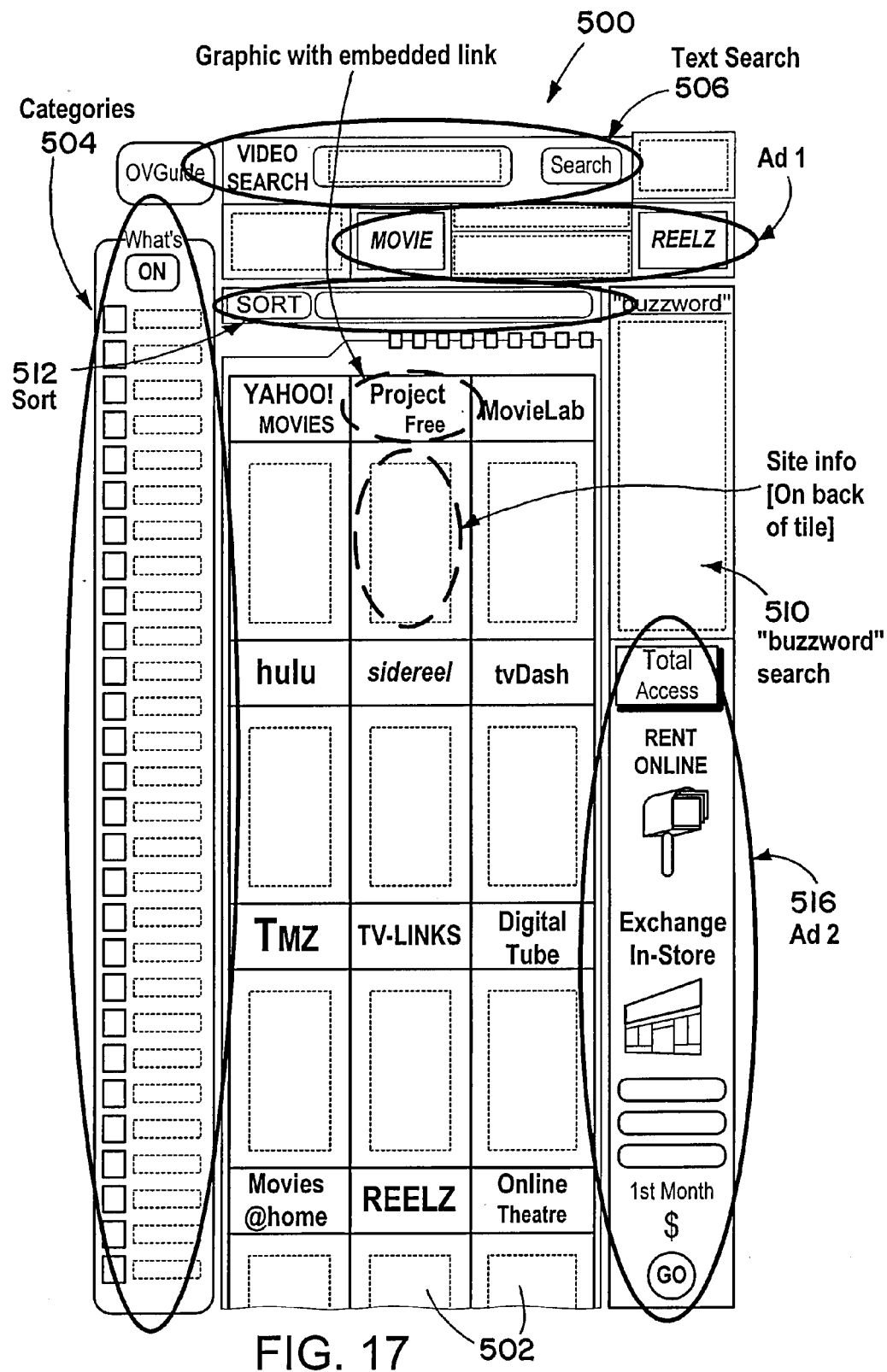
FIG. 17 shows the elements of a personal computer (one foot experience) web page.

FIG. 17 shows a web site 500 with typical design characteristics for personal computer viewing. The site 500 is a website aggregator that allows users to find sites providing online video content. The core elements are a series of tiles 502 used for video site discovery. Each of these tiles 502 including graphics (e.g. a logo) with embedded links at a top portion, and site information on a bottom portion. The tiles are tightly packed with information, and abutted against each other in a manner characteristic of web sites designed for "lean in" viewing. A long categories list 504 runs along the left side of the site, categorizing included sites according to niche content. Elements for video search include are a text search box 506 and an area 510 for buzz word searches. The site also includes a sorting bar 512 for arranging displayed tiles 502, and banner advertisements 516.

Figure 18:
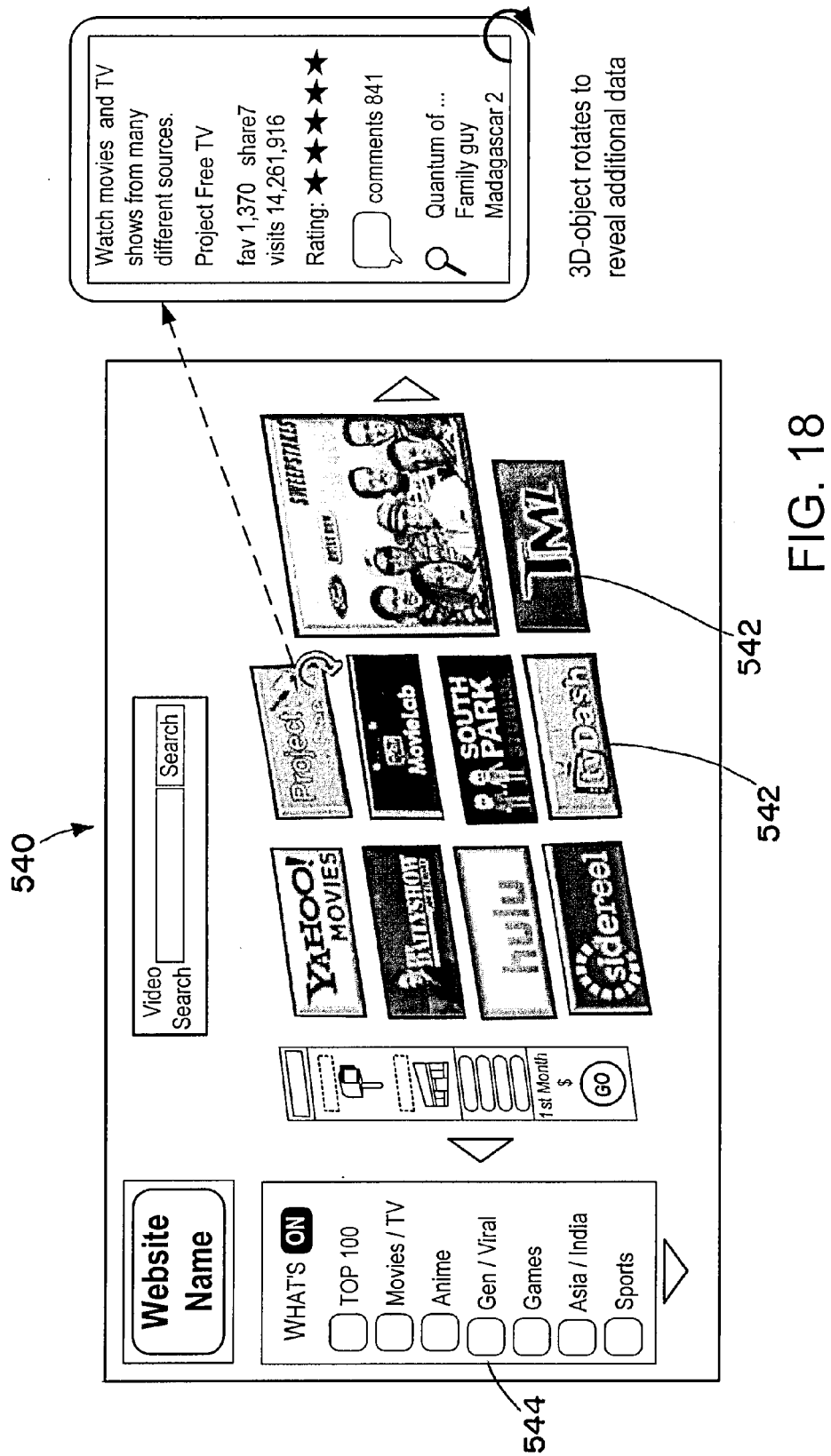
FIG. 18 shows a converted version (ten foot experience) of the web page of FIG. 17 using the design principles of the invention.

FIG. 18 shows a web site 540 based on the site 500 of FIG. 17, redesigned for the ten foot experience following the design principles of the present invention. Several inessential elements are omitted. The tiles 542 are separated with fewer shown on the screen, and the content on the front of the tile 542 is limited to the graphics and site name. To view the additional textual data that has been removed from the front of the tile 542, it is necessary to turn over a tile using the turn function. The long list is redesigned as a short list object 544 with a limited number of prominent entries, using animation to scan up or down the list. As a result of these various adaptations, the elements of the redesigned site appear in a simplified arrangement emphasizing graphics-rich content that is easily viewed from a distance.

In addition to simplified, graphic rich elements, the redesigned web site 540 elements can include three-dimensional data objects. Three-dimensional data objects can include multiple display surfaces with additional displayable information, initially hidden in the display. The three dimensional data objects can be animated objects, in which an additional action (click action) by the user reveals the additional displayable information using the zoom, turn, or leaf function. Examples of such three dimensional, animated data objects are shown in FIGS. 22 and 23.

In addition to using these design rules for a central menu screen based upon a web page, the design rules can be used for a web page serving as a content page (third level of the "three click" navigation interface).

The design rules for the redesigned web page 540 also can take into account the layout and content of the hot zones and any extended zones, particularly where the iTV designer seeks to integrate the "look and feel" and organization of the corner (launch) elements with the central menu screen elements. Thus these design rules can be used for web pages hosted by an iTV site based upon the navigation interface of the invention, as well as for web pages of partner web sites that embody the "look and feel" of the central menu screen of this navigation interface.

Interactive Television Hardware and Software

Interactive television according to the invention may be embodied in a variety of platforms—networked, open, and connected. Examples are IP TV (networked), Internet Television (open) and Cable Television (connected).

IP TV (Internet Protocol Television) is a system in which digital television service is delivered using Internet Protocol over a network infrastructure, which may include delivery by a broadband connection. In IP TV, instead of television being delivered through traditional broadcast and cable formats, it is received by the viewer through the technologies used for computer networks. A typical IP TV service is delivered over a so-called walled garden network, which is engineered to ensure bandwidth efficient delivery of vast amounts of multicast video traffic. IP TV's discrete service provider networks typically require a special IP TV set-top-box.

Internet television is television distributed through the Internet. The primary models for Internet television are streaming Internet TV, and selectable video on an Internet location, typically a website. Internet television videos can also be broadcast with a peer-to-peer network, which doesn't rely on single website's streaming. Using Internet television, viewers can choose the show they want to watch from a library of shows.

Cable television employs fixed optical fibers or coaxial cables as opposed to the over-the-air method used in traditional television broadcasting. Cable television signals use only a portion of the bandwidth available over coaxial lines, leaving space for other digital services such as broadband internet. Broadband internet over coaxial cable uses cable modems to convert the network data into a digital signal that can be transferred over coaxial cable.

Figure 16:
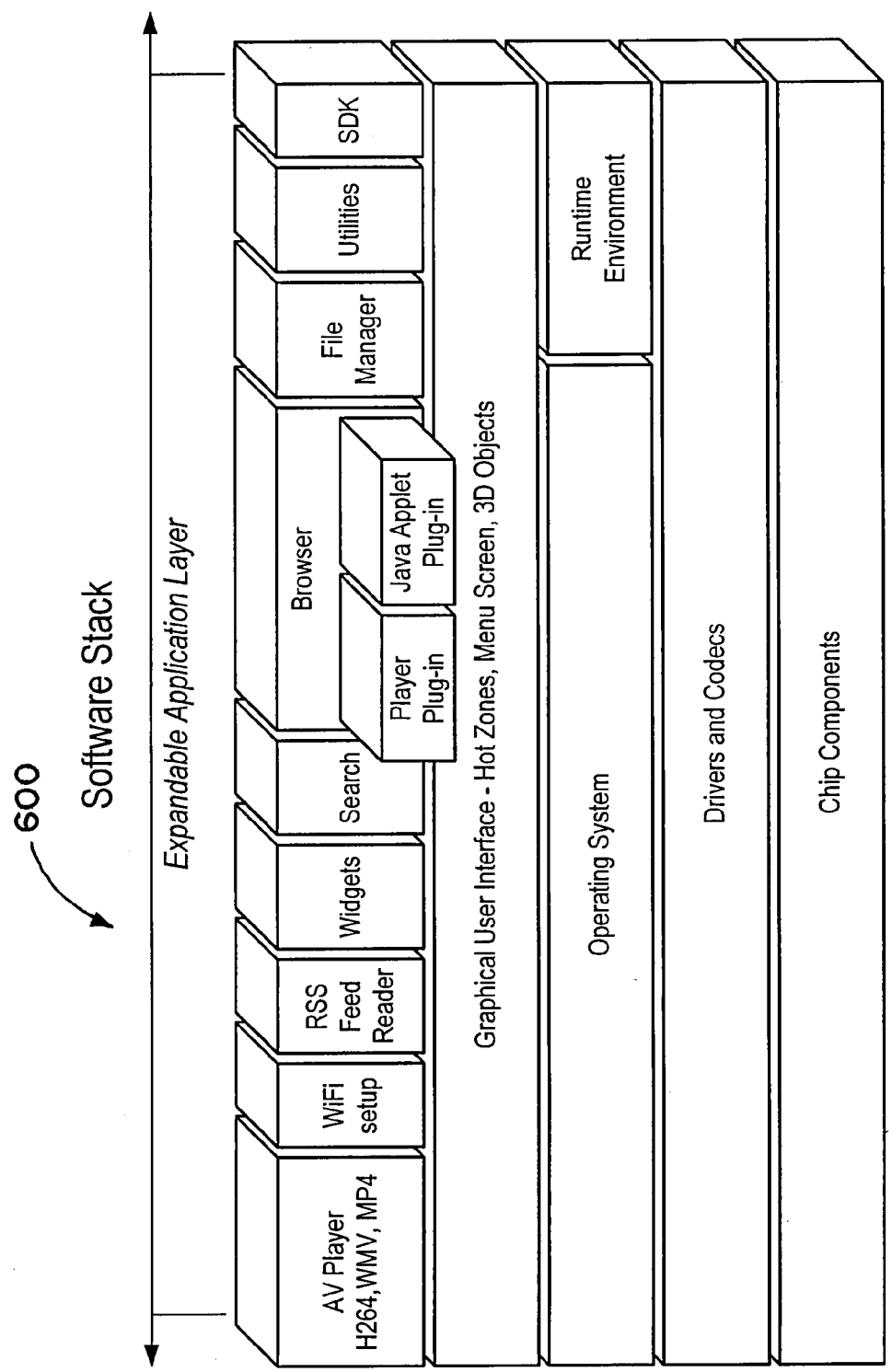
FIG. 16 is a schematic diagram of the software stack for an interactive television using the invention.

FIG. 16 is a schematic diagram of a software stack 600 for an IP TV, Internet television, or other devices (with suitable adaptations of the drivers and codecs depending on the device). The software stack of FIG. 16 enables users to seamlessly operate and move content and data between devices that incorporate the GUI of the invention e.g. in a similar software stack.

Illustrative drivers and codecs, and operating system, may be based upon the Linux Operating System. The runtime environment is a virtual machine state which provides software services for processes or programs while a computer is running. An example of a runtime environment is Adobe AIR, of Adobe Systems Incorporated, San Jose Calif.

The graphical user interface of the invention is built upon these software elements, and serves as an application platform. The top layer of the software stack is an expandable application layer.

The expandable application layer, with examples of related content, includes:
  Audio-video player, e.g. for media encoded in H264, WMV, and MPEG-4 codecs
  WiFi wireless access
  RSS Feed Reader for subscription to web feeds of interest to the viewer, such as social networking sites, traffic and weather information, etc.
  Widgets, small desktop applications that use the principle of skinning, such as widgets compatible with the Yahoo! Widget Engine of Yahoo, Inc, Sunnyvale Calif.
  Search engines, including video search engines such as that of Truveo, Inc. San Francisco Calif.
  Browser, including player plug-in and JAVA applet plug in (Java is a registered trademark of Sun Microsystems, Inc, Santa Clara Calif.). The browser can be used for example to access video aggregator sites
  File manager, which can be used for personal content such as video, audio and photographs
  Concierge—travel and entertainment application
  Utilities, including device controls, inputs, and device utility applications
  Software Development Kit (SDK)

The expandable application layers include a variety of applications and utilities for searching and discovery of content, for requesting content (for download or play), and for playing content. The iTV graphical user interface of the invention naturally and efficiently combines television and video applications with a wide variety of other applications such as social networking, widgets, etc. in an interactive television that is well-suited to the ten foot experience. A professional iTV system manager can aggregate and organize content in curated content menus. Additional applications can easily be added to the application layer, while the iTV's GUI scheme aids a system manager in organizing content. This organization also facilitates user access to various types of content, such as professionally produced programming (e.g. via in-line linking), user-generated content, locally-stored personal content, etc.

The graphical user interface can easily be downloaded and installed on multiple user devices, such an interactive television and a hardware media player to provide a uniform GUI across these devices. An inexperienced user can transfer personal content from another device to the iTV for playback or display using the tools described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of controlling an interactive television, the method comprising:
    displaying a layout on the interactive television, wherein the layout includes one or more visual cues to prompt a user regarding a selection action (click action) to be taken on an input device to activate a predetermined function (click event) on the interactive television;
    wherein the one or more visual cues includes a movement-based cue for prompting, as the selection action, a movement-based action that includes moving the input device by translation and/or rotation of the input device, with the moving of the input device activating the predetermined function.

2. The method of claim 1, wherein the one or more visual cues includes at least two visual cues for performing different actions to activate the predetermined function.

3. The method of claim 2,
    wherein one of the at least two visual cues is a visual cue for a cursor-based action that includes positioning a cursor using the input device; and
    wherein another of the at least two visual cues is a visual cue for a movement-based action that includes moving the input device.

4. The method of claim 1, wherein the movement-based cue includes an arrow for prompting translation of the input device in the direction indicated by the arrow.

5. The method of claim 4, wherein the predetermined function activated by the translation includes a zoom function that increases the size of one or more features of the layout.

6. The method of claim 1, wherein the movement-based cue includes an icon for prompting back-and-forth translation of the input device.

7. The method of claim 1, wherein at least one of the visual cues includes an icon that suggests the predetermined function associated with the icon.

8. The method of claim 1, wherein at least one of the visual cues includes an icon that suggests the action associated with the icon.

9. The method of claim 1, wherein at least one of the visual cues includes an icon that suggests both the action and the predetermined function associated with the icon.

10. The method of claim 1, wherein the layout is a three-dimensional layout that includes an illusion of depth into and/or out of the television, and wherein the one or more visual cues includes a depth cue.

11. The method of claim 10, wherein the depth cue suggests a click event comprising movement into and/or out of the depth of the three-dimensional layout.

12. The method of claim 1, further comprising the user moving the input device to perform the movement-based action.

13. The method of claim 12, wherein the user moving the input device includes the user moving the input device horizontally.

14. The method of claim 13, wherein the user moving the input device horizontally includes the user moving the input device successively in opposite horizontal directions to perform the movement-based action.

15. The method of claim 14, wherein the user moving the input device in opposite horizontal directions includes moving the input device successively left and right, in directions parallel to the interactive television.

16. The method of claim 14, wherein the user moving the input device in opposite horizontal directions includes moving the input device successively forward and backward, in directions toward and away from the interactive television.

17. The method of claim 12, wherein the user moving the input device includes the user moving the input device vertically.

18. The method of claim 17, wherein the user moving the input device vertically includes the user moving the input device successively up and down to perform the movement-based action.

19. A method of controlling an interactive television, the method comprising:
    displaying a layout on the interactive television, wherein the layout includes one or more visual cues to prompt a user regarding an action (click action) to be taken on an input device to activate a predetermined function (click event) on the interactive television; and
    wherein the layout is a three-dimensional layout that includes an illusion of depth into and/or out of the television, and wherein the one or more visual cues includes a depth cue; and
    wherein the one or more visual cues includes an abrupt, distinctive increase in level of detail of an object that is displayed on the layout, to suggest to the user the action (click action) to be taken on the input device.

20. The method of claim 19, wherein the depth cue suggests a click event comprising movement into and/or out of the depth of the three-dimensional layout.

21. The method of claim 19, wherein the object prompts the user regarding the action associated with the object following the abrupt, distinctive increase of level of detail of the object.

22. The method of claim 19, wherein the predetermined function is changed from a first predetermined function to a second predetermined function at the abrupt, distinctive increase of level of detail of the object.

23. The method of claim 19, wherein the abrupt, distinctive increase of level of detail of the object comprises an abrupt transition in object size and texture.

24. The method of claim 19, wherein the abrupt, distinctive increase of level of detail of the object comprises an abrupt transition from an indistinct graphical image to a plurality of distinct graphical features.

\* \* \* \* \*